United States Patent
Chen et al.

(10) Patent No.: US 9,681,325 B2
(45) Date of Patent: Jun. 13, 2017

(54) CHANNEL AND INTERFERENCE MEASUREMENT IN LTE/LTE-A NETWORKS INCLUDING UNLICENSED SPECTRUM

(71) Applicant: QUALCOMM Incorporated, San Diego, CA (US)

(72) Inventors: Wanshi Chen, San Diego, CA (US); Durga Prasad Malladi, San Diego, CA (US); Tao Luo, San Diego, CA (US); Peter Gaal, San Diego, CA (US); Yongbin Wei, La Jolla, CA (US); Hao Xu, San Diego, CA (US); Tingfang Ji, San Diego, CA (US); Srinivas Yerramalli, San Diego, CA (US); Naga Bhushan, San Diego, CA (US); Aleksandar Damnjanovic, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 214 days.

(21) Appl. No.: 14/551,927

(22) Filed: Nov. 24, 2014

(65) Prior Publication Data

US 2015/0181453 A1    Jun. 25, 2015

Related U.S. Application Data

(60) Provisional application No. 61/917,997, filed on Dec. 19, 2013.

(51) Int. Cl.
*H04W 24/10*   (2009.01)
*H04L 1/00*    (2006.01)
(Continued)

(52) U.S. Cl.
CPC ........... *H04W 24/10* (2013.01); *H04L 1/0026* (2013.01); *H04L 5/0048* (2013.01); *H04W 16/14* (2013.01)

(58) Field of Classification Search
None
See application file for complete search history.

(56) References Cited

U.S. PATENT DOCUMENTS

2008/0062920 A1*  3/2008  Pi ........................... H04L 1/0029
                                                        370/329
2013/0294352 A1* 11/2013  Park ....................... H04B 7/024
                                                        370/328

(Continued)

FOREIGN PATENT DOCUMENTS

WO    WO-2012078565 A1    6/2012
WO    WO-2012141513 A2   10/2012
WO    WO-2013169191 A2   11/2013

OTHER PUBLICATIONS

International Search Report and Written Opinion—PCT/US2014/067425—ISA/EPO—Mar. 16, 2015.

(Continued)

*Primary Examiner* — Xavier Wong
(74) *Attorney, Agent, or Firm* — Larry J. Moskowitz

(57) ABSTRACT

Channel and interference measurement in long term evolution (LTE)/LTE-Advanced (LTE-A) networks including unlicensed spectrum is discussed in which a user equipment (UE) detects a reference signal from a serving base station over a carrier of a shared spectrum for measurement. The reference signal may be a channel usage beacon signal (CUBS) transmitted by the serving base station prior to transmission or may be a specific channel state information (CSI) reference signal transmitted in the first subframe of a transmission frame. The UE generates a fast CSI feedback report based on the measured reference signal and transmits (Continued)

it to the serving base station. The fast CSI feedback report is received quickly enough by the serving base station such that the base station may apply the CSI feedback to additional transmissions in subsequent subframes within the same transmission frame.

26 Claims, 15 Drawing Sheets

(51) Int. Cl.
H04L 5/00 (2006.01)
H04W 16/14 (2009.01)

(56) References Cited

U.S. PATENT DOCUMENTS

| | | | | |
|---|---|---|---|---|
| 2013/0343317 A1* | 12/2013 | Etemad | | H04B 7/024 370/329 |
| 2014/0036881 A1* | 2/2014 | Kim | | H04L 5/001 370/336 |
| 2014/0078990 A1* | 3/2014 | Lee | | H04L 1/0026 370/329 |
| 2014/0219115 A1* | 8/2014 | Etemad | | H04B 7/024 370/329 |
| 2014/0247748 A1* | 9/2014 | Kang | | H04L 5/0023 370/252 |
| 2014/0355529 A1* | 12/2014 | Zhu | | H04N 21/2365 370/329 |
| 2015/0023440 A1* | 1/2015 | Suh | | H04L 1/006 375/267 |

OTHER PUBLICATIONS

ITL Inc: "The on/off state indication of SCell in LAA unlicensed carrier for DL measurement", 3GPP Draft; R1-145110, 3rd Generation Partnership Project (3GPP), Mobile Competence Centre ; 650, Route Des Lucioles ; F-06921 Sophia-Antipolis Cedex ; France vol. RAN WG 1, No. San Francisco, USA; Nov. 17, 2014-Nov. 21, 2014, Nov. 17, 2014 (Nov. 17, 2014), XP050876142, pp. 1-3.

ZTE: "Considerations on Measurements for LAA", 3GPP Draft; R1-144827 Measurements for LAA_FINAL, 3rd Generation Partnership Project (3GPP), Mobile Competence Centre ; 650, Route Des Lucioles; F-06921 Sophia-Antipolis Cedex ; France vol. RAN WG1, No. San Francisco, USA; Nov. 17, 2014-Nov. 21, 2014, Nov. 17, 2014 (Nov. 17, 2014), XP050875893, pp. 1-4.

* cited by examiner

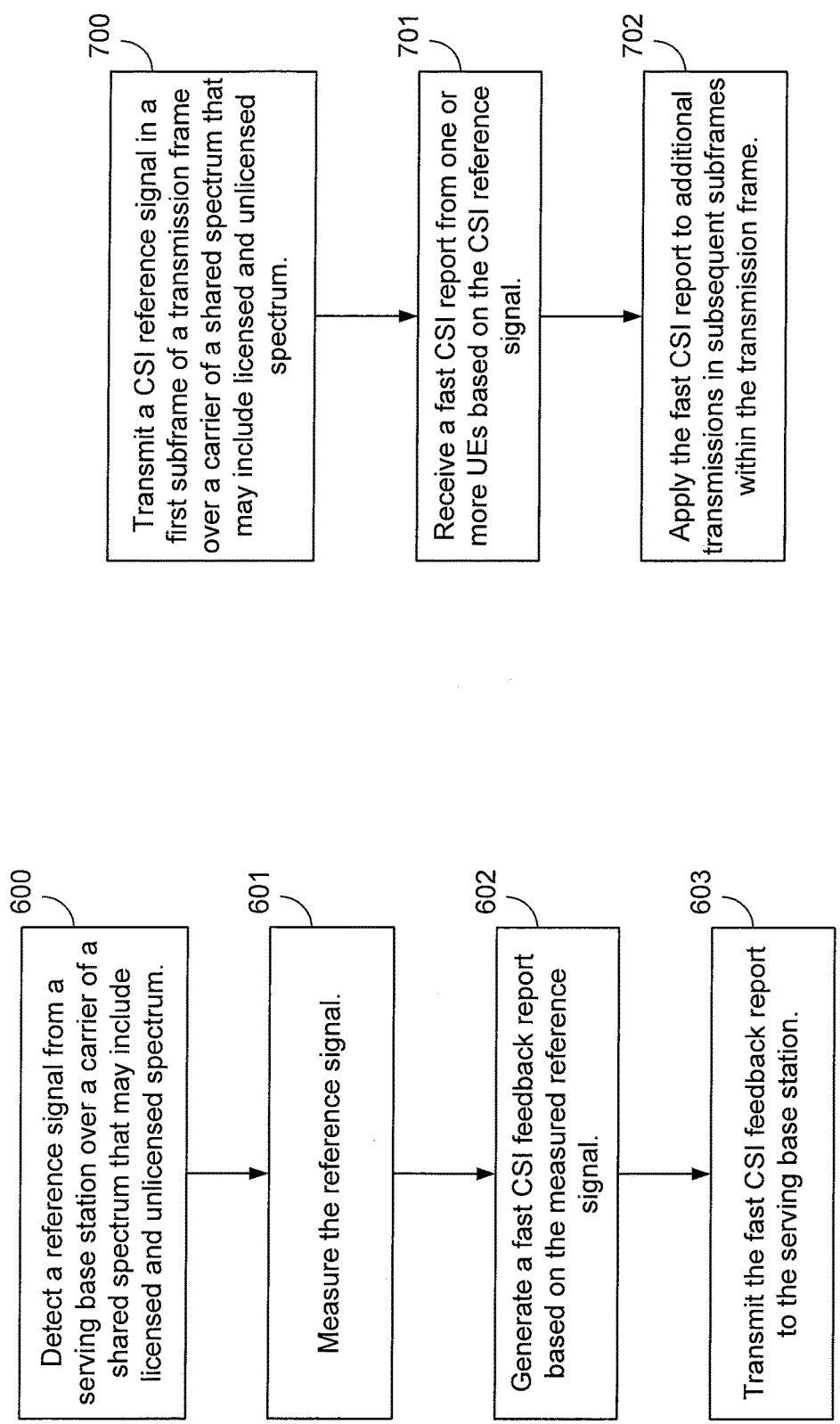

CHANNEL AND INTERFERENCE MEASUREMENT IN LTE/LTE-A NETWORKS INCLUDING UNLICENSED SPECTRUM

CROSS-REFERENCE TO RELATED APPLICATIONS

This application claims the benefit of U.S. Provisional Patent Application No. 61/917,997, entitled, "CHANNEL AND INTERFERENCE MEASUREMENT IN LTE/LTE-A NETWORKS INCLUDING UNLICENSED SPECTRUM," filed on Dec. 19, 2013, which is expressly incorporated by reference herein in its entirety.

BACKGROUND

Field

Aspects of the present disclosure relate generally to wireless communication systems, and more particularly, to channel and interference measurement in long term evolution (LTE)/LTE-Advanced (LTE-A) networks including unlicensed spectrum.

Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance the UMTS technologies not only to meet the growing demand for mobile broadband access, but to advance and enhance the user experience with mobile communications.

SUMMARY

In one aspect of the disclosure, a method of wireless communication includes detecting, by a UE, a reference signal from a serving base station over a carrier of a shared spectrum that may include licensed and unlicensed spectrum, measuring, by the UE, the reference signal, generating, by the UE, a fast CSI feedback report based on the measured reference signal, and transmitting, by the UE, the fast CSI feedback report to the serving base station.

In an additional aspect of the disclosure, a method of wireless communication includes transmitting, by a base station, a CSI reference signal in a first subframe of a transmission frame over a carrier of a shared spectrum that may include licensed and unlicensed spectrum, receiving, at the base station, from one or more UEs a fast CSI report based on the CSI reference signal, and applying, by the base station, the fast CSI report to additional transmissions in subsequent subframes within the transmission frame.

In an additional aspect of the disclosure, an apparatus configured for wireless communication includes means for detecting, by a UE, a reference signal from a serving base station over a carrier of a shared spectrum that may include licensed and unlicensed spectrum, means for measuring, by the UE, the reference signal, means for generating, by the UE, a fast CSI feedback report based on the measured reference signal, and means for transmitting, by the UE, the fast CSI feedback report to the serving base station.

In an additional aspect of the disclosure, an apparatus configured for wireless communication includes means for transmitting, by a base station, a CSI reference signal in a first subframe of a transmission frame over a carrier of a shared spectrum that may include licensed and unlicensed spectrum, means for receiving, at the base station, from one or more UEs a fast CSI report based on the CSI reference signal, and means for applying, by the base station, the fast CSI report to additional transmissions in subsequent subframes within the transmission frame.

In an additional aspect of the disclosure, a non-transitory computer-readable medium having program code recorded thereon. This program code includes code to detect, by a UE, a reference signal from a serving base station over a carrier of a shared spectrum that may include licensed and unlicensed spectrum, code to measure, by the UE, the reference signal, code to generate, by the UE, a fast CSI feedback report based on the measured reference signal, and code to transmit, by the UE, the fast CSI feedback report to the serving base station.

In an additional aspect of the disclosure, a a non-transitory computer-readable medium having program code recorded thereon. This program code includes code to transmit, by a base station, a CSI reference signal in a first subframe of a transmission frame over a carrier of a shared spectrum that may include licensed and unlicensed spectrum, code to receive, at the base station, from one or more UEs a fast CSI report based on the CSI reference signal, and code to apply, by the base station, the fast CSI report to additional transmissions in subsequent subframes within the transmission frame.

In an additional aspect of the disclosure, an apparatus includes at least one processor and a memory coupled to the processor. The processor is configured to detect, by a UE, a reference signal from a serving base station over a carrier of a shared spectrum that may include licensed and unlicensed spectrum, to measure, by the UE, the reference signal, to generate, by the UE, a fast CSI feedback report based on the measured reference signal, and to transmit, by the UE, the fast CSI feedback report to the serving base station.

In an additional aspect of the disclosure, an apparatus includes at least one processor and a memory coupled to the processor. The processor is configured to transmit, by a base station, a CSI reference signal in a first subframe of a transmission frame over a carrier of a shared spectrum that may include licensed and unlicensed spectrum, to receive, at the base station, from one or more UEs a fast CSI report based on the CSI reference signal, and to apply, by the base station, the fast CSI report to additional transmissions in subsequent subframes within the transmission frame.

BRIEF DESCRIPTION OF THE DRAWINGS

FIGS. 6 and 7 are functional block diagrams illustrating example blocks executed to implement one aspect of the present disclosure.

DETAILED DESCRIPTION

Figure 1:
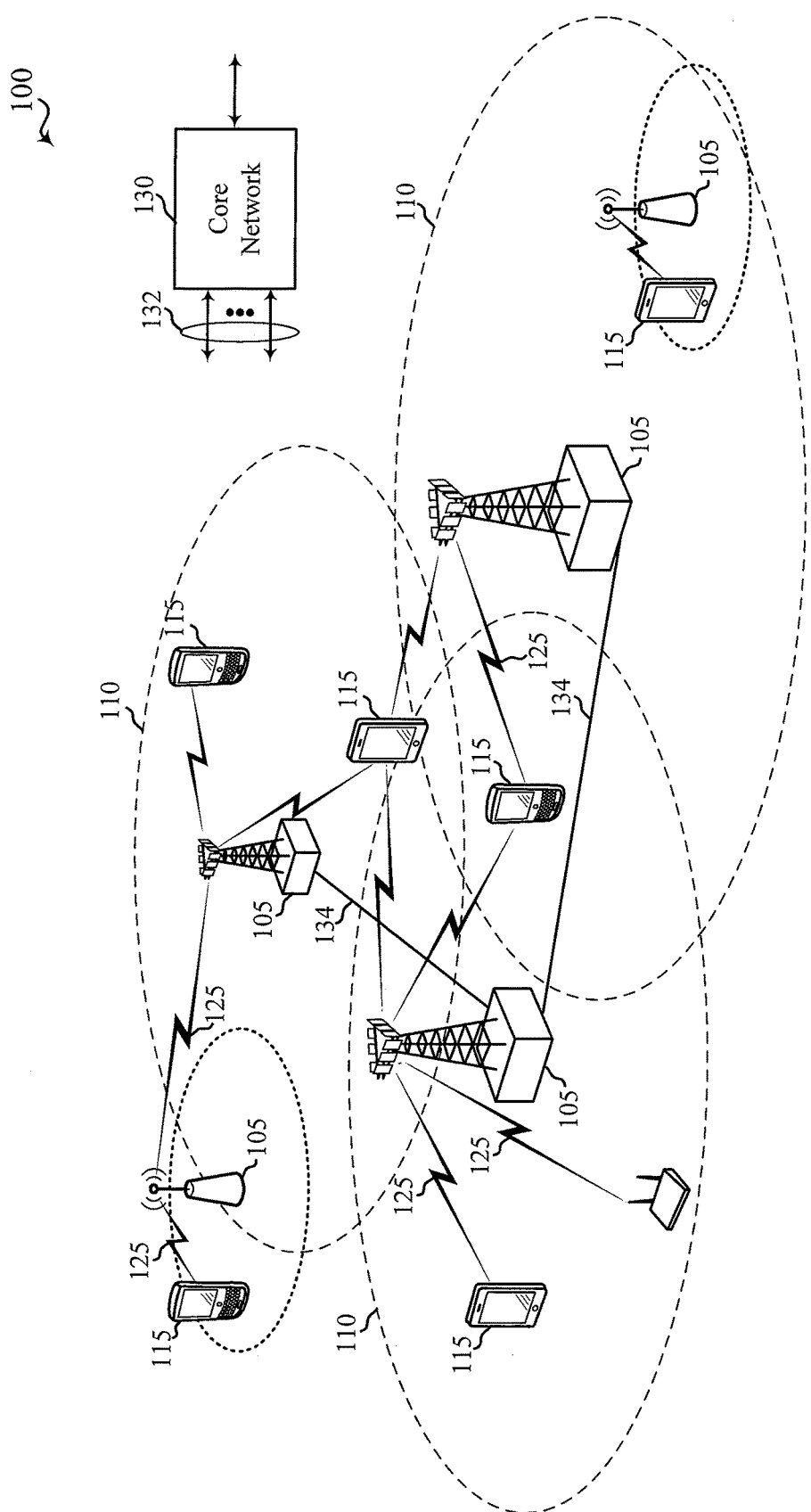
FIG. 1 shows a diagram that illustrates an example of a wireless communications system according to various embodiments.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

Operators have so far looked at WiFi as the primary mechanism to use unlicensed spectrum to relieve ever increasing levels of congestion in cellular networks. However, a new carrier type (NCT) based on LTE/LTE-A including an unlicensed spectrum may be compatible with carrier-grade WiFi, making LTE/LTE-A with unlicensed spectrum an alternative to WiFi. LTE/LTE-A with unlicensed spectrum may leverage LTE concepts and may introduce some modifications to physical layer (PHY) and media access control (MAC) aspects of the network or network devices to provide efficient operation in the unlicensed spectrum and to meet regulatory requirements. The unlicensed spectrum may range from 600 Megahertz (MHz) to 6 Gigahertz (GHz), for example. In some scenarios, LTE/LTE-A with unlicensed spectrum may perform significantly better than WiFi. For example, an all LTE/LTE-A with unlicensed spectrum deployment (for single or multiple operators) compared to an all WiFi deployment, or when there are dense small cell deployments, LTE/LTE-A with unlicensed spectrum may perform significantly better than WiFi. LTE/LTE-A with unlicensed spectrum may perform better than WiFi in other scenarios such as when LTE/LTE-A with unlicensed spectrum is mixed with WiFi (for single or multiple operators).

For a single service provider (SP), an LTE/LTE-A network with unlicensed spectrum may be configured to be synchronous with a LTE network on the licensed spectrum. However, LTE/LTE-A networks with unlicensed spectrum deployed on a given channel by multiple SPs may be configured to be synchronous across the multiple SPs. One approach to incorporate both the above features may involve using a constant timing offset between LTE/LTE-A networks without unlicensed spectrum and LTE/LTE-A networks with unlicensed spectrum for a given SP. An LTE/LTE-A network with unlicensed spectrum may provide unicast and/or multicast services according to the needs of the SP. Moreover, an LTE/LTE-A network with unlicensed spectrum may operate in a bootstrapped mode in which LTE cells act as anchor and provide relevant cell information (e.g., radio frame timing, common channel configuration, system frame number or SFN, etc.) for LTE/LTE-A cells with unlicensed spectrum. In this mode, there may be close interworking between LTE/LTE-A without unlicensed spectrum and LTE/LTE-A with unlicensed spectrum. For example, the bootstrapped mode may support the supplemental downlink and the carrier aggregation modes described above. The PHY-MAC layers of the LTE/LTE-A network with unlicensed spectrum may operate in a standalone mode in which the LTE/LTE-A network with unlicensed spectrum operates independently from an LTE network without unlicensed spectrum. In this case, there may be a loose interworking between LTE without unlicensed spectrum and LTE/LTE-A with unlicensed spectrum based on RLC-level aggregation with co-located LTE/LTE-A with/without unlicensed spectrum cells, or multiflow across multiple cells and/or base stations, for example.

The techniques described herein are not limited to LTE, and may also be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). LTE and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description below, however, describes an LTE system for purposes of example, and LTE terminology is used in much of the description below, although the techniques are applicable beyond LTE applications.

Thus, the following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Referring first to FIG. 1, a diagram illustrates an example of a wireless communications system or network 100. The system 100 includes base stations (or cells) 105, communication devices 115, and a core network 130. The base stations 105 may communicate with the communication devices 115 under the control of a base station controller (not shown), which may be part of the core network 130 or the base stations 105 in various embodiments. Base stations 105 may communicate control information and/or user data with the core network 130 through backhaul links 132. In embodiments, the base stations 105 may communicate, either directly or indirectly, with each other over backhaul links 134, which may be wired or wireless communication links. The system 100 may support operation on multiple carriers (waveform signals of different frequencies). Multi-carrier transmitters can transmit modulated signals simultaneously on the multiple carriers. For example, each communication link 125 may be a multi-carrier signal modulated according to the various radio technologies described above. Each modulated signal may be sent on a different carrier and may carry control information (e.g., reference signals, control channels, etc.), overhead information, data, etc.

The base stations 105 may wirelessly communicate with the devices 115 via one or more base station antennas. Each of the base station 105 sites may provide communication coverage for a respective geographic area 110. In some embodiments, base stations 105 may be referred to as a base transceiver station, a radio base station, an access point, a radio transceiver, a basic service set (BSS), an extended service set (ESS), a NodeB, eNodeB (eNB), Home NodeB, a Home eNodeB, or some other suitable terminology. The coverage area 110 for a base station may be divided into sectors making up only a portion of the coverage area (not shown). The system 100 may include base stations 105 of different types (e.g., macro, micro, and/or pico base stations). There may be overlapping coverage areas for different technologies.

In some embodiments, the system 100 is an LTE/LTE-A network that supports one or more unlicensed spectrum modes of operation or deployment scenarios. In other embodiments, the system 100 may support wireless communications using an unlicensed spectrum and an access technology different from LTE/LTE-A with unlicensed spectrum, or a licensed spectrum and an access technology different from LTE/LTE-A. The terms evolved Node B (eNB) and user equipment (UE) may be generally used to describe the base stations 105 and devices 115, respectively. The system 100 may be a Heterogeneous LTE/LTE-A network with or without unlicensed spectrum in which different types of eNBs provide coverage for various geographical regions. For example, each eNB 105 may provide communication coverage for a macro cell, a pico cell, a femto cell, and/or other types of cell. Small cells such as pico cells, femto cells, and/or other types of cells may include low power nodes or LPNs. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a pico cell may be referred to as a pico eNB. And, an eNB for a femto cell may be referred to as a femto eNB or a home eNB. An eNB may support one or multiple (e.g., two, three, four, and the like) cells.

The core network 130 may communicate with the eNBs 105 via a backhaul 132 (e.g., S1, etc.). The eNBs 105 may also communicate with one another, e.g., directly or indirectly via backhaul links 134 (e.g., X2, etc.) and/or via backhaul links 132 (e.g., through core network 130). The system 100 may support synchronous or asynchronous operation. For synchronous operation, the eNBs may have similar frame and/or gating timing, and transmissions from different eNBs may be approximately aligned in time. For asynchronous operation, the eNBs may have different frame and/or gating timing, and transmissions from different eNBs may not be aligned in time. The techniques described herein may be used for either synchronous or asynchronous operations.

The UEs 115 are dispersed throughout the system 100, and each UE may be stationary or mobile. A UE 115 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with macro eNBs, pico eNBs, femto eNBs, relays, and the like.

The communications links 125 shown in system 100 may include uplink (UL) transmissions from a mobile device 115 to a base station 105, and/or downlink (DL) transmissions, from a base station 105 to a mobile device 115. The downlink transmissions may also be called forward link transmissions while the uplink transmissions may also be called reverse link transmissions. The downlink transmissions may be made using a licensed spectrum (e.g., LTE), an unlicensed spectrum (e.g., LTE/LTE-A with unlicensed spectrum), or both (LTE/LTE-A with/without unlicensed spectrum). Similarly, the uplink transmissions may be made using a licensed spectrum (e.g., LTE), an unlicensed spectrum (e.g., LTE/LTE-A with unlicensed spectrum), or both (LTE/LTE-A with/without unlicensed spectrum).

In some embodiments of the system 100, various deployment scenarios for LTE/LTE-A with unlicensed spectrum may be supported including a supplemental downlink (SDL) mode in which LTE downlink capacity in a licensed spectrum may be offloaded to an unlicensed spectrum, a carrier aggregation mode in which both LTE downlink and uplink capacity may be offloaded from a licensed spectrum to an unlicensed spectrum, and a standalone mode in which LTE downlink and uplink communications between a base station (e.g., eNB) and a UE may take place in an unlicensed spectrum. Base stations 105 as well as UEs 115 may support one or more of these or similar modes of operation. OFDMA communications signals may be used in the communications links 125 for LTE downlink transmissions in an unlicensed spectrum, while SC-FDMA communications signals may be used in the communications links 125 for LTE uplink transmissions in an unlicensed spectrum. Additional details regarding the implementation of LTE/LTE-A with unlicensed spectrum deployment scenarios or modes of operation in a system such as the system 100, as well as other features and functions related to the operation of LTE/LTE-A with unlicensed spectrum, are provided below with reference to FIGS. 2A-15B.

Figure 2A:
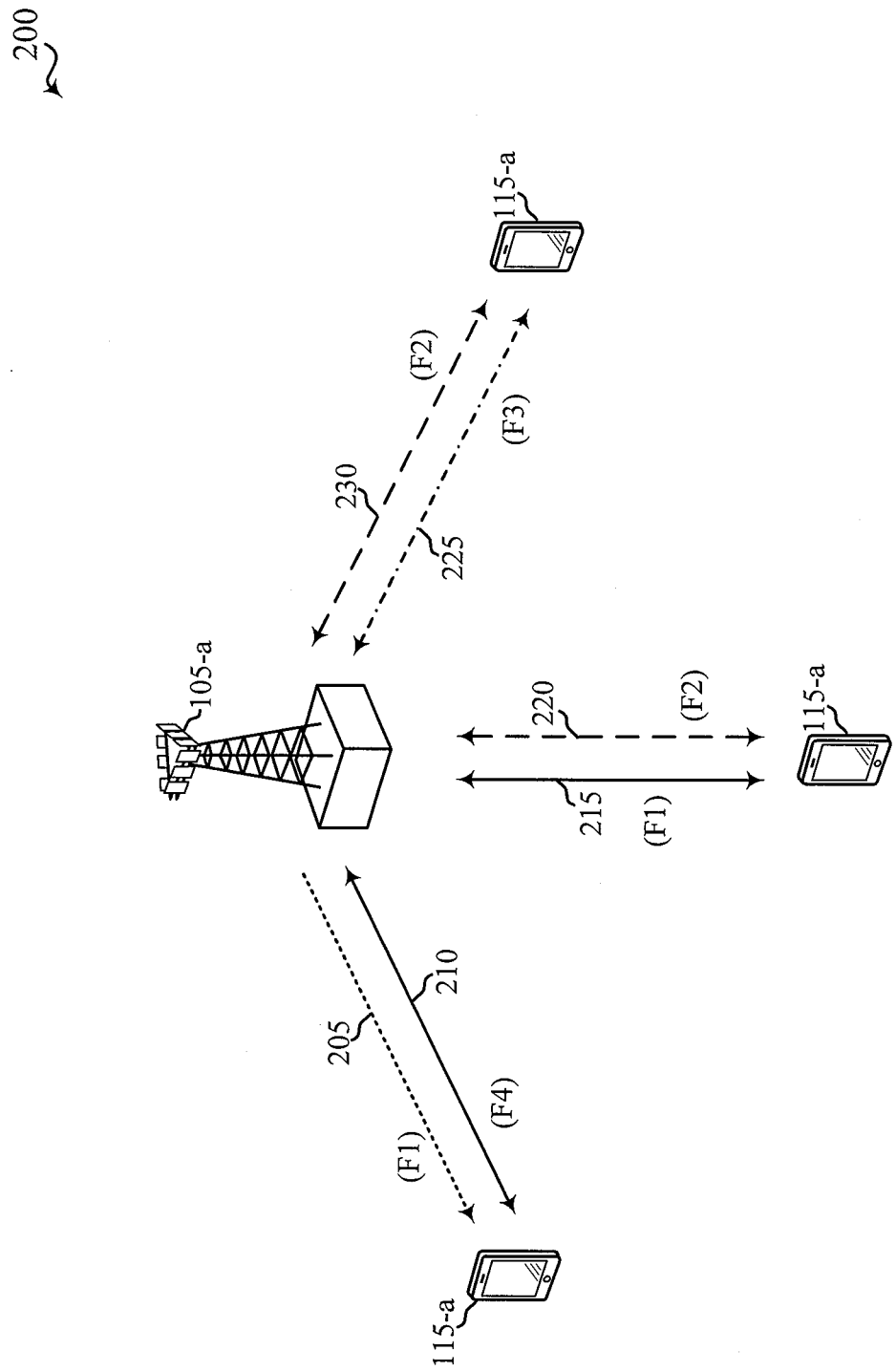
FIG. 2A shows a diagram that illustrates examples of deployment scenarios for using LTE in an unlicensed spectrum according to various embodiments.

Turning next to FIG. 2A, a diagram 200 shows examples of a supplemental downlink mode and of a carrier aggregation mode for an LTE network that supports LTE/LTE-A with unlicensed spectrum. The diagram 200 may be an example of portions of the system 100 of FIG. 1. Moreover, the base station 105-a may be an example of the base stations 105 of FIG. 1, while the UEs 115-a may be examples of the UEs 115 of FIG. 1.

In the example of a supplemental downlink mode in diagram 200, the base station 105-a may transmit OFDMA communications signals to a UE 115-a using a downlink 205. The downlink 205 is associated with a frequency F1 in an unlicensed spectrum. The base station 105-a may transmit OFDMA communications signals to the same UE 115-a using a bidirectional link 210 and may receive SC-FDMA communications signals from that UE 115-a using the bidirectional link 210. The bidirectional link 210 is associated with a frequency F4 in a licensed spectrum. The downlink 205 in the unlicensed spectrum and the bidirectional link 210 in the licensed spectrum may operate concurrently. The downlink 205 may provide a downlink capacity offload for the base station 105-a. In some embodiments, the downlink 205 may be used for unicast services (e.g., addressed to one UE) services or for multicast services (e.g., addressed to several UEs). This scenario may occur with any service provider (e.g., traditional mobile network operator or MNO) that uses a licensed spectrum and needs to relieve some of the traffic and/or signaling congestion.

In one example of a carrier aggregation mode in diagram 200, the base station 105-a may transmit OFDMA communications signals to a UE 115-a using a bidirectional link 215 and may receive SC-FDMA communications signals from the same UE 115-a using the bidirectional link 215. The bidirectional link 215 is associated with the frequency F1 in the unlicensed spectrum. The base station 105-a may also transmit OFDMA communications signals to the same UE 115-a using a bidirectional link 220 and may receive SC-FDMA communications signals from the same UE 115-a using the bidirectional link 220. The bidirectional link 220 is associated with a frequency F2 in a licensed spectrum. The bidirectional link 215 may provide a downlink and uplink capacity offload for the base station 105-a. Like the supplemental downlink described above, this scenario may occur with any service provider (e.g., MNO) that uses a licensed spectrum and needs to relieve some of the traffic and/or signaling congestion.

In another example of a carrier aggregation mode in diagram 200, the base station 105-a may transmit OFDMA communications signals to a UE 115-a using a bidirectional link 225 and may receive SC-FDMA communications signals from the same UE 115-a using the bidirectional link 225. The bidirectional link 225 is associated with the frequency F3 in an unlicensed spectrum. The base station 105-a may also transmit OFDMA communications signals to the same UE 115-a using a bidirectional link 230 and may receive SC-FDMA communications signals from the same UE 115-a using the bidirectional link 230. The bidirectional link 230 is associated with the frequency F2 in the licensed spectrum. The bidirectional link 225 may provide a downlink and uplink capacity offload for the base station 105-a. This example and those provided above are presented for illustrative purposes and there may be other similar modes of operation or deployment scenarios that combine LTE/LTE-A with or without unlicensed spectrum for capacity offload.

As described above, the typical service provider that may benefit from the capacity offload offered by using LTE/LTE-A with unlicensed spectrum is a traditional MNO with LTE spectrum. For these service providers, an operational configuration may include a bootstrapped mode (e.g., supplemental downlink, carrier aggregation) that uses the LTE primary component carrier (PCC) on the licensed spectrum and the LTE secondary component carrier (SCC) on the unlicensed spectrum.

In the supplemental downlink mode, control for LTE/LTE-A with unlicensed spectrum may be transported over the LTE uplink (e.g., uplink portion of the bidirectional link 210). One of the reasons to provide downlink capacity offload is because data demand is largely driven by downlink consumption. Moreover, in this mode, there may not be a regulatory impact since the UE is not transmitting in the unlicensed spectrum. There is no need to implement listen-before-talk (LBT) or carrier sense multiple access (CSMA) requirements on the UE. However, LBT may be implemented on the base station (e.g., eNB) by, for example, using a periodic (e.g., every 10 milliseconds) clear channel assessment (CCA) and/or a grab-and-relinquish mechanism aligned to a radio frame boundary.

In the carrier aggregation mode, data and control may be communicated in LTE (e.g., bidirectional links 210, 220, and 230) while data may be communicated in LTE/LTE-A with unlicensed spectrum (e.g., bidirectional links 215 and 225). The carrier aggregation mechanisms supported when using LTE/LTE-A with unlicensed spectrum may fall under a hybrid frequency division duplexing-time division duplexing (FDD-TDD) carrier aggregation or a TDD-TDD carrier aggregation with different symmetry across component carriers.

Figure 2B:
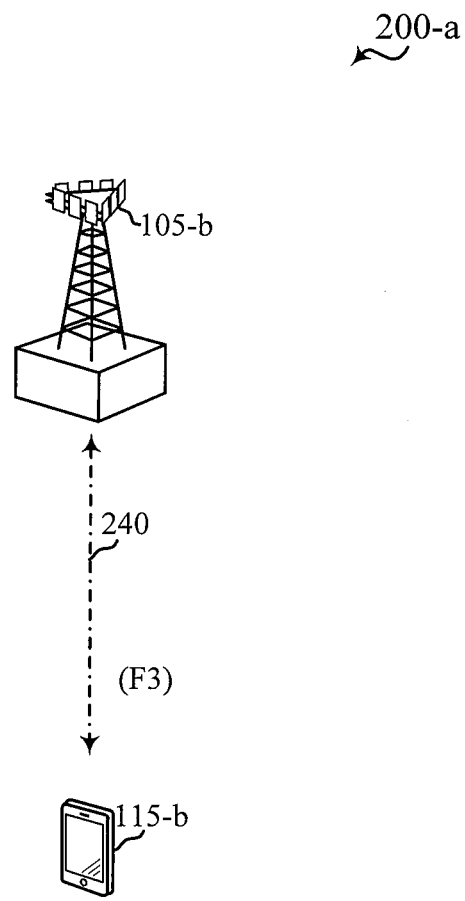
FIG. 2B shows a diagram that illustrates another example of a deployment scenario for using LTE in an unlicensed spectrum according to various embodiments.

FIG. 2B shows a diagram 200-*a* that illustrates an example of a standalone mode for LTE/LTE-A with unlicensed spectrum. The diagram 200-*a* may be an example of portions of the system 100 of FIG. 1. Moreover, the base station 105-*b* may be an example of the base stations 105 of FIG. 1 and the base station 105-*a* of FIG. 2A, while the UE 115-*b* may be an example of the UEs 115 of FIG. 1 and the UEs 115-*a* of FIG. 2A.

In the example of a standalone mode in diagram 200-*a*, the base station 105-*b* may transmit OFDMA communications signals to the UE 115-*b* using a bidirectional link 240 and may receive SC-FDMA communications signals from the UE 115-*b* using the bidirectional link 240. The bidirectional link 240 is associated with the frequency F3 in an unlicensed spectrum described above with reference to FIG. 2A. The standalone mode may be used in non-traditional wireless access scenarios, such as in-stadium access (e.g., unicast, multicast). The typical service provider for this mode of operation may be a stadium owner, cable company, event hosts, hotels, enterprises, and large corporations that do not have licensed spectrum. For these service providers, an operational configuration for the standalone mode may use the PCC on the unlicensed spectrum. Moreover, LBT may be implemented on both the base station and the UE.

Figure 3:
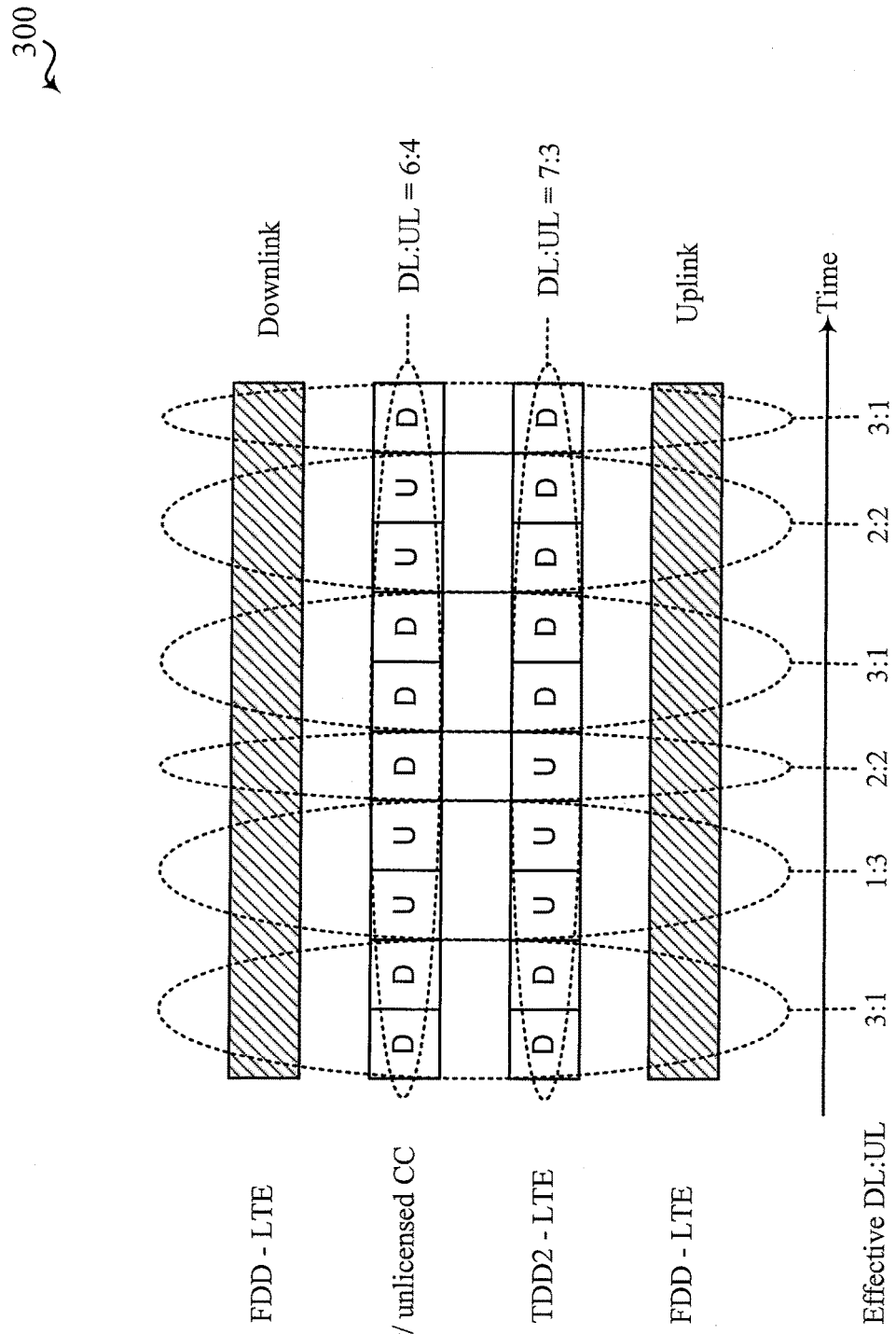
FIG. 3 shows a diagram that illustrates an example of carrier aggregation when using LTE concurrently in licensed and unlicensed spectrum according to various embodiments.

Turning next to FIG. 3, a diagram 300 illustrates an example of carrier aggregation when using LTE concurrently in licensed and unlicensed spectrum according to various embodiments. The carrier aggregation scheme in diagram 300 may correspond to the hybrid FDD-TDD carrier aggregation described above with reference to FIG. 2A. This type of carrier aggregation may be used in at least portions of the system 100 of FIG. 1. Moreover, this type of carrier aggregation may be used in the base stations 105 and 105-*a* of FIG. 1 and FIG. 2A, respectively, and/or in the UEs 115 and 115-*a* of FIG. 1 and FIG. 2A, respectively.

In this example, an FDD (FDD-LTE) may be performed in connection with LTE in the downlink, a first TDD (TDD1) may be performed in connection with LTE/LTE-A including unlicensed spectrum, a second TDD (TDD2) may be performed in connection with LTE with licensed spectrum, and another FDD (FDD-LTE) may be performed in connection with LTE in the uplink with licensed spectrum. TDD1 results in a DL:UL ratio of 6:4, while the ratio for TDD2 is 7:3. On the time scale, the different effective DL:UL ratios are 3:1, 1:3, 2:2, 3:1, 2:2, and 3:1. This example is presented for illustrative purposes and there may be other carrier aggregation schemes that combine the operations of LTE/LTE-A with or without unlicensed spectrum.

Figure 4:
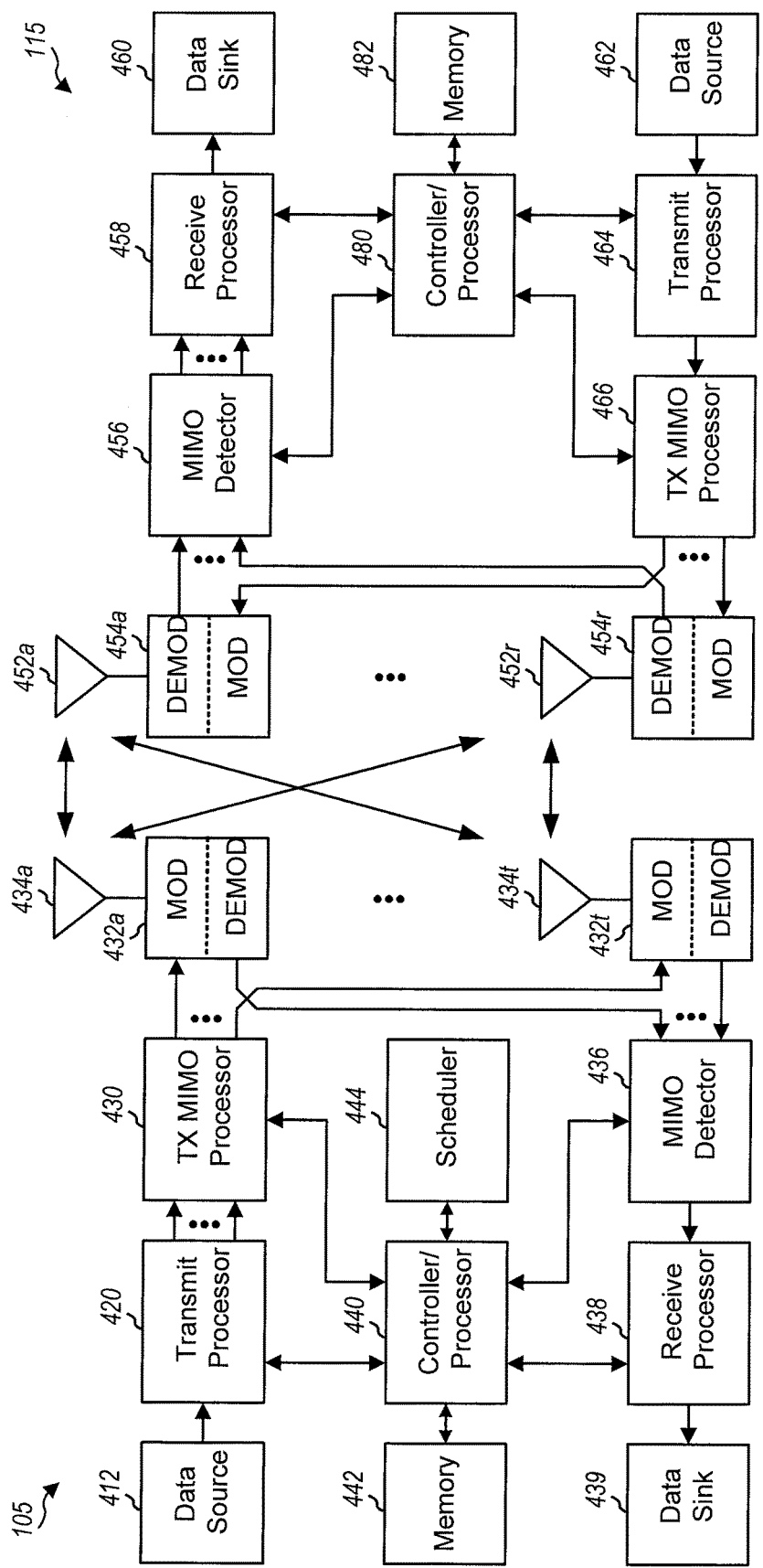
FIG. 4 is a block diagram conceptually illustrating a design of a base station/eNB and a UE configured according to one aspect of the present disclosure.

FIG. 4 shows a block diagram of a design of a base station/eNB 105 and a UE 115, which may be one of the base stations/eNBs and one of the UEs in FIG. 1. The eNB 105 may be equipped with antennas 434a through 434t, and the UE 115 may be equipped with antennas 452a through 452r. At the eNB 105, a transmit processor 420 may receive data from a data source 412 and control information from a controller/processor 440. The control information may be for the physical broadcast channel (PBCH), physical control format indicator channel (PCFICH), physical hybrid automatic repeat request indicator channel (PHICH), physical downlink control channel (PDCCH), etc. The data may be for the physical downlink shared channel (PDSCH), etc. The transmit processor 420 may process (e.g., encode and symbol map) the data and control information to obtain data symbols and control symbols, respectively. The transmit processor 420 may also generate reference symbols, e.g., for the primary synchronization signal (PSS), secondary synchronization signal (SSS), and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 115, the antennas 452a through 452r may receive the downlink signals from the eNB 105 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 115 to a data sink 460, and provide decoded control information to a controller/processor 480.

On the uplink, at the UE 115, a transmit processor 464 may receive and process data (e.g., for the physical uplink shared channel (PUSCH)) from a data source 462 and control information (e.g., for the physical uplink control channel (PUCCH)) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the eNB 105. At the eNB 105, the uplink signals from the UE 115 may be received by the antennas 434, processed by the modulators 432, detected by a MIMO detector 436 if applicable, and further processed by a receive processor 438 to obtain decoded data and control information sent by the UE 115. The processor 438 may provide the decoded data to a data sink 439 and the decoded control information to the controller/processor 440.

The controllers/processors 440 and 480 may direct the operation at the eNB 105 and the UE 115, respectively. The controller/processor 440 and/or other processors and modules at the eNB 105 may perform or direct the execution of various processes for the techniques described herein. The controllers/processor 480 and/or other processors and modules at the UE 115 may also perform or direct the execution of the functional blocks illustrated in FIGS. 6 and 7, and/or other processes for the techniques described herein. The memories 442 and 482 may store data and program codes for the eNB 105 and the UE 115, respectively. A scheduler 444 may schedule UEs for data transmission on the downlink and/or uplink.

Figure 5:
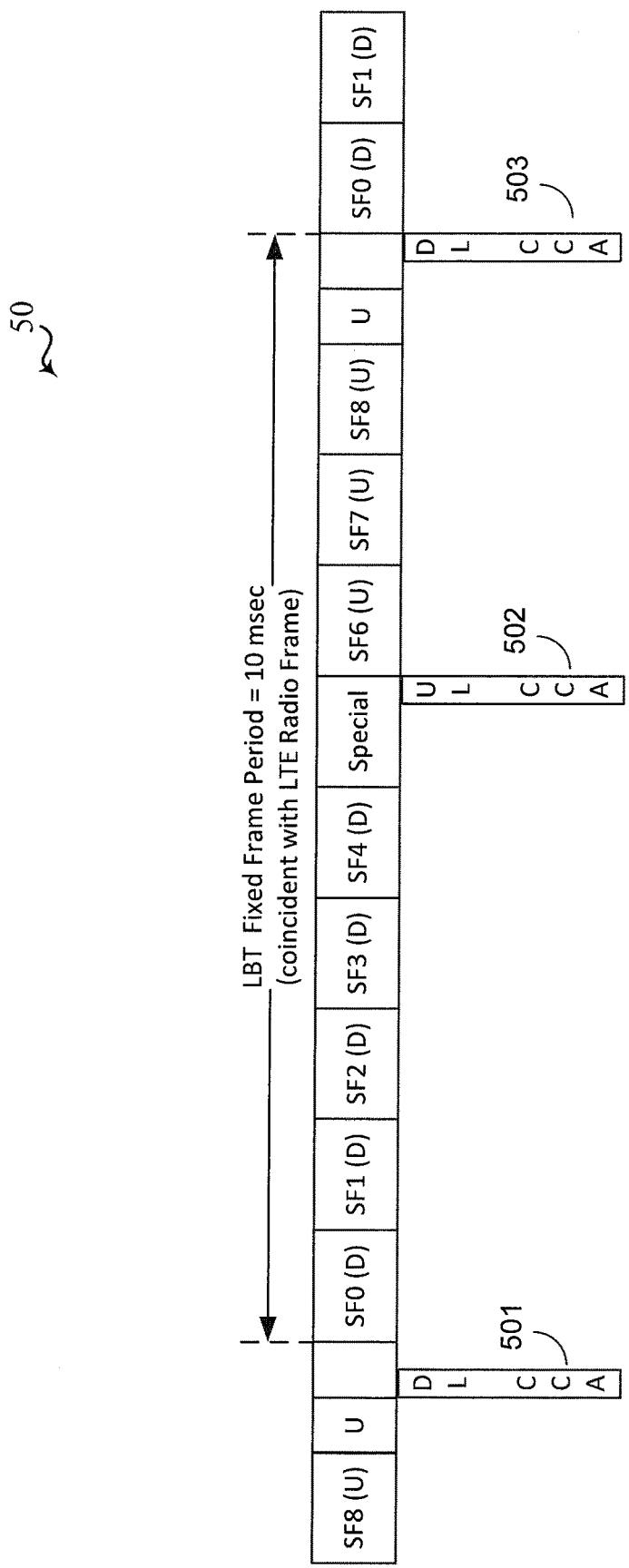
FIG. 5 illustrates a downlink transmission stream over a carrier of a shared spectrum that may include licensed and unlicensed spectrum.

In LTE/LTE-A including unlicensed spectrum, listen-before-talk (LBT) processing is used by a node before initiating transmissions. FIG. 5 illustrates a downlink transmission stream 50 over a carrier of a shared spectrum that may include licensed and unlicensed spectrum. Multiple CCA (clear channel assessment) opportunities 501-503 may be available, which can be shared by different operators/cells. eNB and UE may perform CCA separately for DL and UL CCA.

A node may also have CCA exempt transmissions (CETs). CCA is not generally necessary for autonomous transmissions subject to some regulatory requirements. CETs may happen regularly, e.g., every 80 ms, with a duration of a fraction of a subframe. CETs may also be present for both DL and UL transmissions. CET may carry important system information and other information, such as group power control, and the like.

In each CCA cleared frame, the number of DL subframes scheduled by nodes operating LTE/LTE-A including unlicensed spectrum may not always be the same as the number of available DL subframes. For example, some nodes may have a limited DL buffer, while other nodes may not have the same number of available DL subframes due to interference management. In such example scenarios, in a CCA-cleared frame, a LTE/LTE-A including unlicensed spectrum node may only schedule DL transmissions in the first 3 DL subframes.

In order for a UE to properly demodulate signals and/or generate CSI feedback in LTE systems, a UE performs interference measurements. Interference measurements are usually taken on either common reference signals (CRS) or interference measurement resources (IMR). In particular, an IMR is based on a zero-power (ZP) CSI-RS configuration. IMR are generally configured through RRC signaling in a periodic manner for a 4 resource element (RE) per physical resource block (PRB) pair. A CSI-RS process may also be associated with a non-zero power (NZP) CSI-RS configuration and an IMR. The UE, thus, measures the channel based on the NZP CSI-RS and measures the interference based on IMR. Based on these two measurements, the UE may then provide the corresponding channel state information feedback.

LTE/LTE-A networks including unlicensed spectrum introduce variations in the typical interference that may be seen by a participating UE. Because transmissions are not guaranteed over the unlicensed spectrum, different interference from different sources may be seen depending on whether or not the CCA process has cleared a particular LBT frame. In a frame when CCA is not cleared, the DL interference seen by a UE in the frame may originate from other operators, WiFi hidden nodes, or even different cells of the same operator. A WiFi hidden node may be considered nodes that transmit over WiFi protocols that are not at a fixed location and always available as a WiFi access point. For example, a stationary WiFi node that is not always on may be considered a hidden node that provides WiFi interference when it is activated. Additionally, a mobile WiFi node, which could include a mobile hot spot or UE with WiFi transmission capabilities, could be considered a hidden node when providing WiFi transmission interference. Such WiFi nodes generally transmit in an ad hoc manner, thus, would not necessarily be a known and regular source of interference.

In a frame when CCA is cleared, the DL interference seen by a UE in the frame may come from hidden nodes of other operators, WiFi hidden nodes, or different cells of the same operator. Hidden nodes of other operators may arise in instances where the CUBS transmission of the serving eNB is not able to block the transmission of eNBs from other operators (e.g., due to distance or the measured energy dropping below some threshold), but the served UE experiences strong interference from those neighbor eNBs of the other operators. In some instances of a cleared CCA, the eNB may not have data in the buffer to transmit. In such cases, the eNB may either elect not to transmit at all in the CCA cleared frame or may elect to hold the frame by transmitting CUBS. When the eNB has no data to transmit in the LBT frame and elects to transmit CUBS, a UE may see DL interference from hidden nodes of other operators, WiFi hidden nodes, and different cells of the same operator. However, when the eNB elects not to transmit at all (or when the eNB elects not even to perform CCA), a UE may see DL interference from other operators, hidden nodes from WiFi, and different cells of the same operator.

Because transmission in LTE/LTE-A networks including unlicensed spectrum is not guaranteed and may be variable from transmitter to transmitter based on how much data is buffered for transmission at the particular transmitter, it may be beneficial to have a faster turn-around for channel state information (CSI) feedback. Various aspects of the present disclosure provide for reducing the CSI feedback delay through reduction in measurement and reporting times.

In current LTE/LTE-A networks, the CSI feedback delay includes measurement delay and reporting delay. The measurement delay, which is the time between the UE measuring the channel until the UE is ready to report is at least 4 ms in LTE/LTE-A networks. For larger numbers of CSI processes and/or time division duplex (TDD) systems, depending on NZP CSI-RS and/or CSI-IM configurations and the like, the measurement delay could be even larger than 4 ms. The reporting delay depends on whether the particular CSI reporting is periodic or aperiodic. Moreover, with periodic CSI-RS reporting, the reporting delay will also depend on the periodicity assigned to the reporting.

For use with the unpredictable variations of LTE/LTE-A networks including unlicensed spectrum, a measurement delay of 4 ms may be too large to be consistently useful. With a 4 ms delay, the reporting of CSI based on measurement in one frame could not be used in most of the subframes in the frame. Because UL transmissions are not guaranteed in the subsequent frames (unless in CET subframes), even longer CSI feedback delay may be experienced. Accordingly, there is a strong motivation to finish CSI feedback related operation in the same subframe for LTE/LTE-A networks including unlicensed spectrum.

FIG. 6 is a functional block diagram illustrating example blocks executed to implement one aspect of the present disclosure from a UE. At block 600, a UE, such as UE 115 (FIG. 4), detects a reference signal from a serving base station, such as eNB 105 (FIG. 4), over a carrier of a shared spectrum that may include licensed and unlicensed spectrum. The reference signal detected may either be transmitted by the serving base station at an earlier time, such as in the first subframe of a transmission frame or even the first few symbols of the first subframe. Alternatively, the reference signal detected by the UE may be the CUBS transmitted by the base station when a CCA check has cleared the unlicensed channel.

At block 601, the UE measures the reference signal and, at block 602, generates a fast CSI feedback report based on the measured reference signal. As will be described in greater detail below, a fast CSI feedback report may be reduced in size (e.g., bitwidth), reduced by CSI type, includes a reduced number of CSI processes, or have reduced performance or processing requirements. At block 603, the UE then transmits the fast CSI feedback report to the serving base station. The UE may be configured to transmit the fast CSI feedback report with less delay than a standard CSI report.

FIG. 7 is a functional block diagram illustrating example blocks executed to implement one aspect of the present disclosure from a base station. At block 700, a base station, such as eNB 105, transmits a CSI reference signal in a first subframe of a transmission frame over a carrier of a shared spectrum that may include licensed and unlicensed spectrum. As noted, the CSI reference signal may be transmitted in the first subframe of the transmission frame or even in the first few symbols (e.g., within the first third of the symbols) of the first subframe.

At block 701, the base station receives a fast CSI report from one or more served UEs based on the CSI reference signal. The fast CSI report may be received in the subframe immediately after the subframe in which the base station transmitted the reference signal. At block 702, the base station, applies the fast CSI report to additional transmissions in subsequent subframes within the same transmission frame. Because the base station receives the fast CSI report in the next subframe after transmitting the CSI reference signal, it may use the resulting information within the same transmission frame for later subframes.

Figure 8:
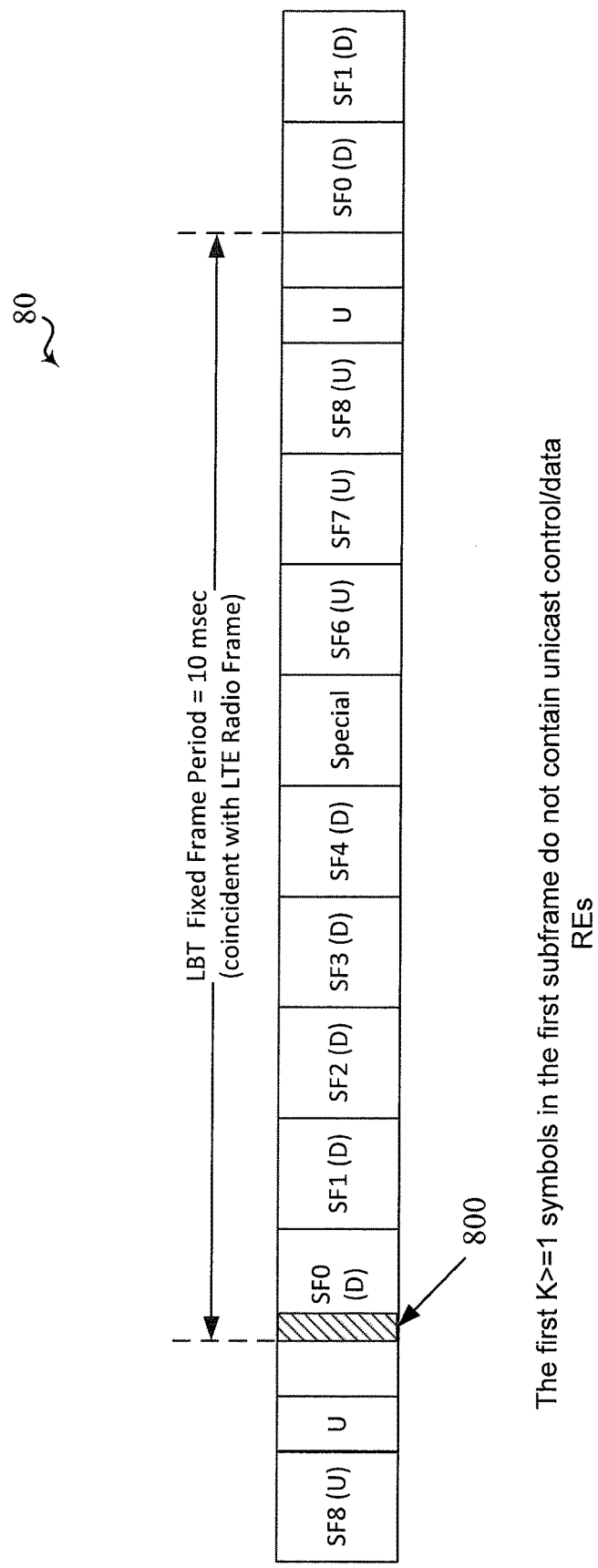
FIG. 8 illustrates a downlink transmission stream over a carrier of a shared spectrum that may include licensed and unlicensed spectrum carrier from a base station configured according to one aspect of the present disclosure.

With part of the CSI reporting delay attributable to the measurement delay, various aspects of the present disclosure may place RS for channel measurement in the early subframe(s) of a given LBT frame, or even in the first few symbols of the first subframe of an LBT frame. FIG. 8 illustrates a downlink transmission stream 80 over a carrier of a shared spectrum that may include licensed and unlicensed spectrum from a base station configured according to one aspect of the present disclosure. The base station, such as eNB 105, may transmit an RS for CSI measurement over the first symbols 800 of the first subframe, SF0, of the LBT frame. By not including unicast control or data transmissions in the first few symbols of the first subframe, a eNB may have more time to make scheduling decisions depending on whether CCA has been cleared for one or more component carriers (CCs). In selected aspects, groupcast/broadcast REs may also be allowed in the first few symbols with the RS for CSI reporting (e.g., PDSCH for SIBs for the cell). In additional aspects of the disclosure, this feature for including only RS in the first few symbols of the first subframe of a frame may be enabled/disabled on a per CC basis or per node basis, which can then be tied to the number of CCs configured for a particular node (e.g., for a small number of CCs, the feature is disabled; otherwise, it's enabled).

Figure 9:
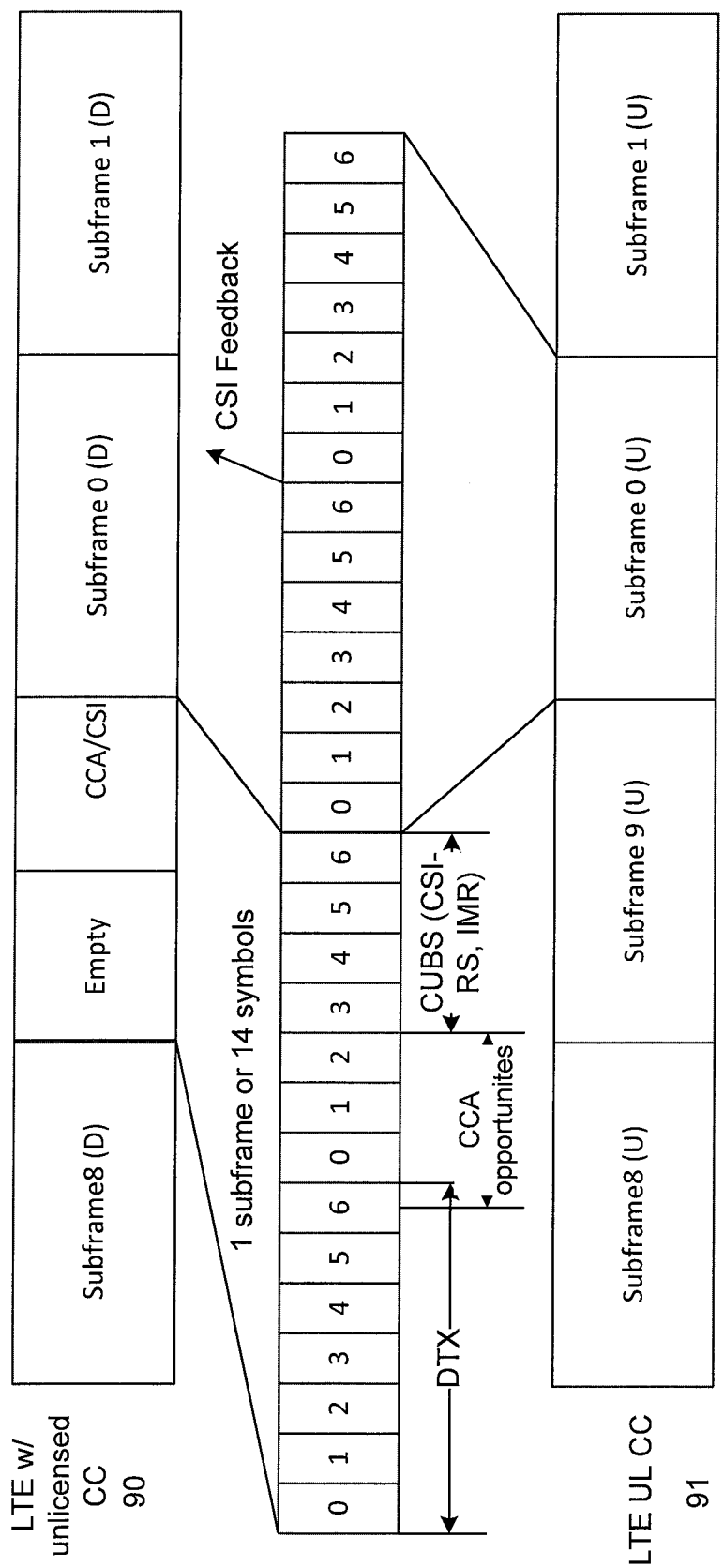
FIGS. 9-11 illustrate downlink transmission streams over a carrier of a shared spectrum that may include licensed and unlicensed spectrum from a base station and associated uplink transmission streams from one or more UEs, the base station and one or more UEs configured according to aspects of the present disclosure.

In additional aspects of the present disclosure, CUBS may be considered for use with CSI feedback. In such aspects, CUBS may be used for both channel and interference measurements. FIG. 9 illustrates a downlink transmission stream 90 over a carrier of a shared spectrum that may include licensed and unlicensed spectrum from a base station, such as eNB 105, and an associated uplink transmission stream 91 from a UE, such as UE 115, the base station and UE are configured according to aspects of the present disclosure. As illustrated, the base station will begin transmitting CUBS at symbols 3-6 after the CCA opportunities in symbols 0-2, in the subframe after subframe 8. Because of the timing in which CUBS are generally transmitted, use of CUBS for CSI feedback measurement could enable even faster CSI feedback. The UE associated with uplink transmission stream 91 may then measure the CUBS, generate a CSI feedback report and transmit the CSI report to the base station at symbol 6 of uplink subframe 0 of uplink transmission stream 91.

Figure 10:
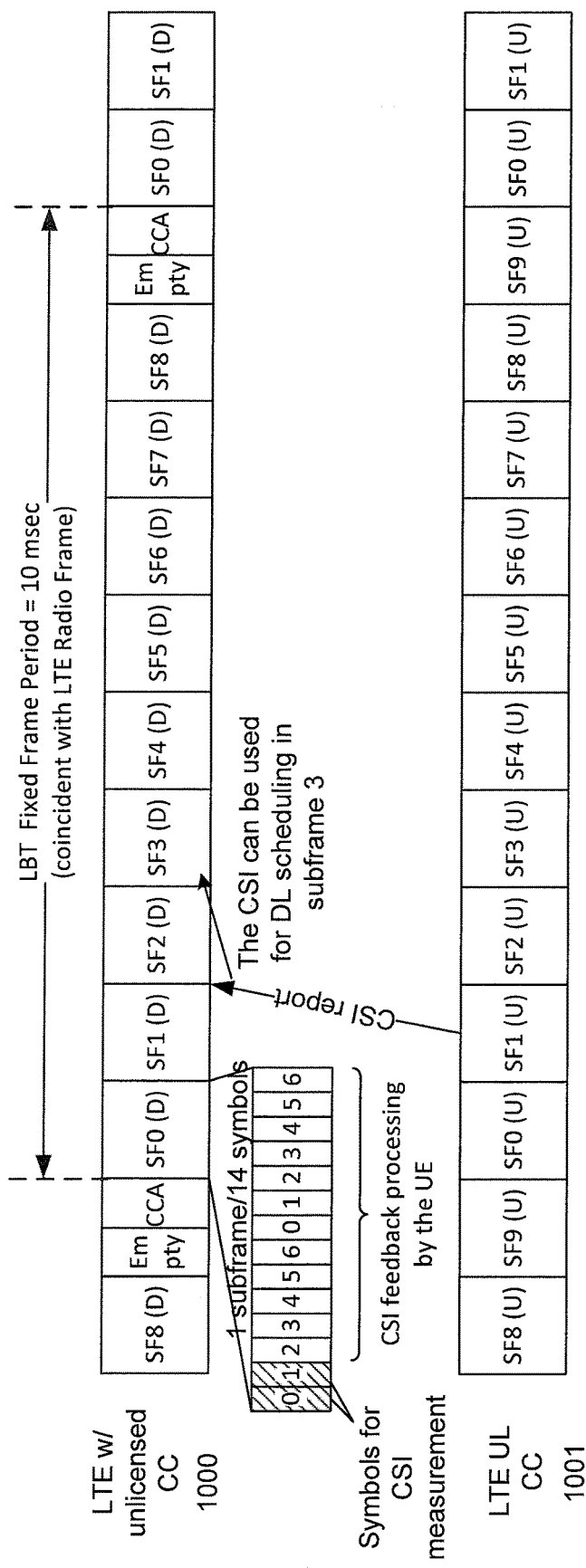

In order to reduce the CSI feedback delay, the measurement delay itself may be reduced. For example, instead of the 4 ms measurement delay, a shorter delay may be considered, e.g., 1 ms, 2 ms, or the like. FIG. 10 illustrates a downlink transmission stream 1000 over a carrier of a shared spectrum that may include licensed and unlicensed spectrum from a base station, such as eNB 105, and an associated uplink transmission stream 1001 from a UE, such as UE 115, the base station and UE are configured according to aspects of the present disclosure. The base station associated with downlink transmission stream 1000 transmits the CSI reference signal in the first two symbols, symbols 0 and 1, of downlink SF0. The UE associated with uplink transmission stream 1001 measures the reference signal at uplink SF0 and can quickly transmit the CSI report during uplink SF1. The base station associated with downlink transmission stream 1000 receives the CSI report at the beginning of downlink SF2, and may use it for downlink scheduling beginning in downlink SF3. With the shortened measurement time, CSI reporting can immediately follow, such that CSI measurements performed in the first subframe can be used in subsequent subframes of the frame as early as possible.

One mechanism for reducing the measurement delay in various aspects of the present disclosure is, as noted above, providing the CSI-RS (NZP and/or IM) earlier in the LBT frame, or by using CUBS as a CSI-RS. With the earlier availability of the RS for determining CSI, the sooner the UE may begin measurements.

Another potential mechanism provided by aspects of the present disclosure for reducing measurement delay is to reduce the CSI feedback for reporting. Under fast CSI feedback, the CSI may be the same as LTE without unlicensed spectra. However, a reduced CSI feedback may also be considered, which can be reduced through reduced bitwidth, reporting types, performance/processing requirements, number of CSI processes, and the like.

For example, reducing CSI feedback through a reduced bitwidth may use less than 4 bits for the report. N<4, where N represents the number of bits. In the current implementations having a 4 ms delay, a 4-bit channel quality indicator (CQI) is used (N=4). Instead of this 4-bit CQI, a reduced-bit CQI may be used that identifies a delta of the CQI, $\delta_{CQI}$. For example, where N=1, a one-bit $\delta_{CQI}$ may be used simply to indicate whether channel conditions have improved or degraded in comparison with the last channel measurement. Where N=2, a two-bit $\delta_{CQI}$ may be used to provide more detail, such as to indicate the change in channel conditions with respect to the last report. Various other mechanisms may be used for reducing the bitwidth of the CSI report to decrease the feedback delay.

Additional aspects of the present disclosure may reduce the CQI report by reducing the reporting types. A typical CQI report will include wideband CQI, subband CQI, rank, wideband PMI, subband PMI, preferred subband CQI, and the like. Instead of provided full report of all of these various reporting types, various aspects of the present disclosure may provide a limited set of reporting types that would allow fast feedback, e.g., only reporting for the wideband CQI or for some subset of the full report types.

Because aspects of the present disclosure provide for a reduced CQI, $\delta_{CQI}$, the performance and processing requirements may also be reduced compared with the regular CSI feedback. For example, different processing requirements may be defined, such as providing raw channel or interference conditions. Moreover, the number of CSI processes may be reduced. This reduction in the number of CSI processes may be configured by the network or may be hardcoded in a particular UE. It may also be provided in relation to UE capability or category. With these reduced processing requirement or reductions in the number of CSI processes handled, the overall performance requirements may consequently be reduced as well, as compared to regular CSI feedback performance.

Figure 11:
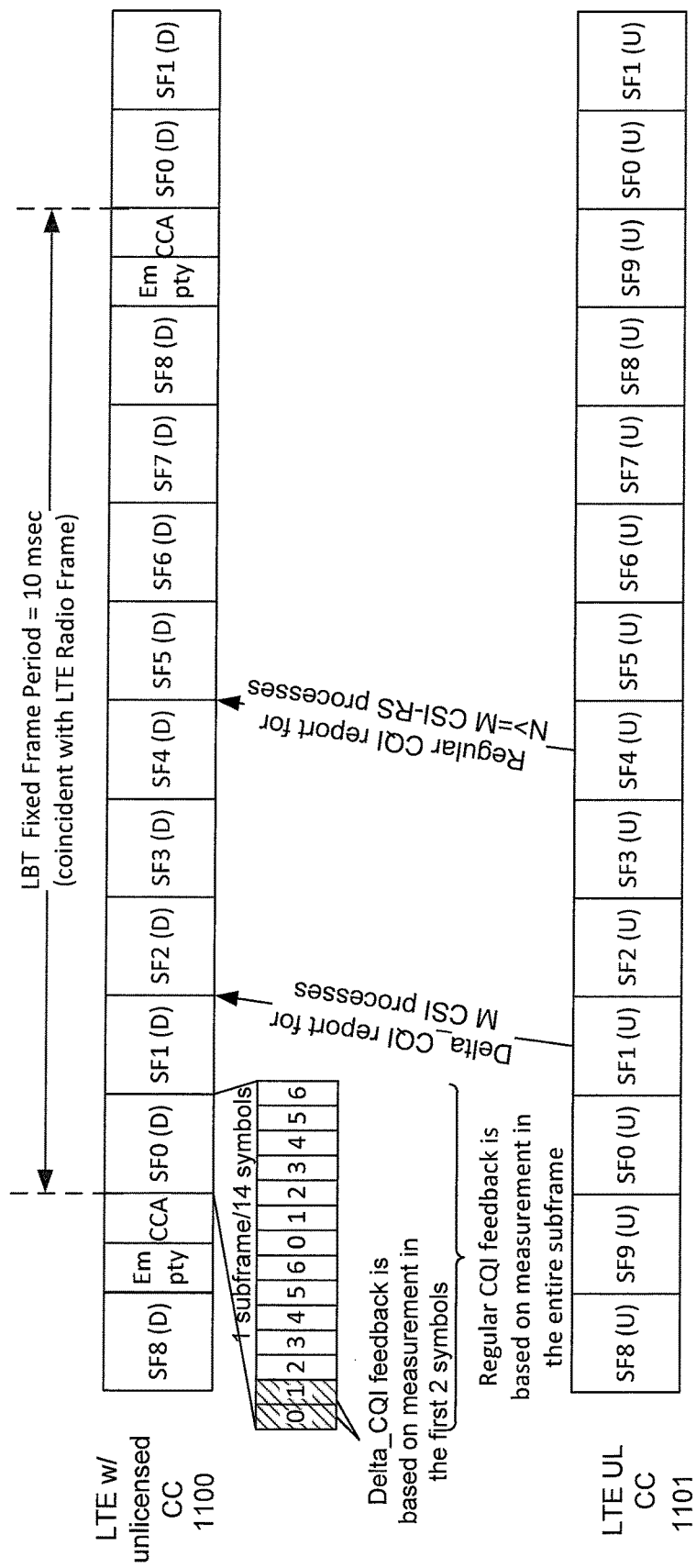

Various aspects of the present disclosure may also provide for reporting a regular or refined CSI report at the regular time or, at least, later than the fast reporting reduced CSI feedback report. FIG. 11 illustrates a downlink transmission stream 1100 over a carrier of a shared spectrum that may include licensed and unlicensed spectrum from a base station, such as eNB 105, and an associated uplink transmission stream 1101 from a UE, such as UE 115, the base station and UE are configured according to aspects of the present disclosure. The base station associated with downlink transmission stream 1100 transmits a reference signal for CSI measurements in the first two symbols, symbols 0 and 1, of downlink SF0. The UE associated with uplink transmission stream 1101 generates a fast CSI feedback report and transmits the fast CSI report to the base station in uplink SF1. For example, the fast CSI report may only include a subset of the available CSI types or processes and may only be based on the reference signals measured in downlink symbols 0 and 1 of downlink SF0. The subsequent refined or regular CSI report may, thus, be provided in order to provide richer, more detailed and accurate CSI information for the same number or more CSI processes, which may also be based on UE measurement of a larger set of symbols. For example, the regular or refined CSI feedback is determined based on measurement of all of the downlink symbols of downlink SF0 and includes more that the selected subset of CSI processes or types. The UE associated with uplink transmission frame 1101 would then transmit the regular or refined CSI feedback report to the base station at uplink SF4.

Figure 12:
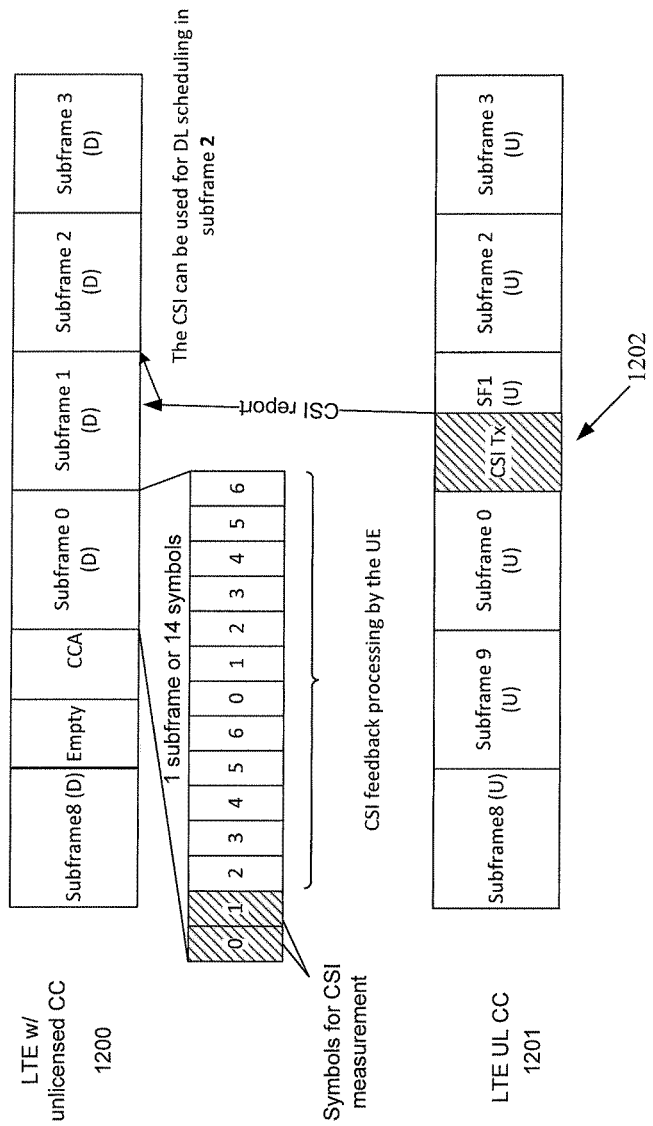
FIG. 12 illustrates a portion of a downlink transmission stream over an a carrier of a shared spectrum that may include licensed and unlicensed spectrum from a base station and an associated uplink transmission stream from a UE, the base station and UE configured according to one aspect of the present disclosure.

Additional aspects of the present disclosure may reduce CSI feedback delay by reducing CSI feedback transmission from the UE. FIG. 12 illustrates a portion of a downlink transmission stream 1200 over a carrier of a shared spectrum that may include licensed and unlicensed spectrum from a base station and an associated uplink transmission stream 1201 from a UE, the base station and UE configured according to one aspect of the present disclosure. Currently, CSI feedback transmissions are sent on a full, 1 ms UL subframe. The additional aspects may consider shortening the UL transmission time. For example, various implementations of such aspects may provide for UEs to send CSI feedback on 0.5 ms uplink transmission 1202 on PUCCH or PUSCH. In such implementations, the CSI measured based on RS in the first subframe (SF0) may be transmitted with a 0.5 ms uplink transmission 1202 in the second uplink subframe (SF1), which the eNB may use for DL scheduling in the third downlink subframe (SF2).

Figure 13:
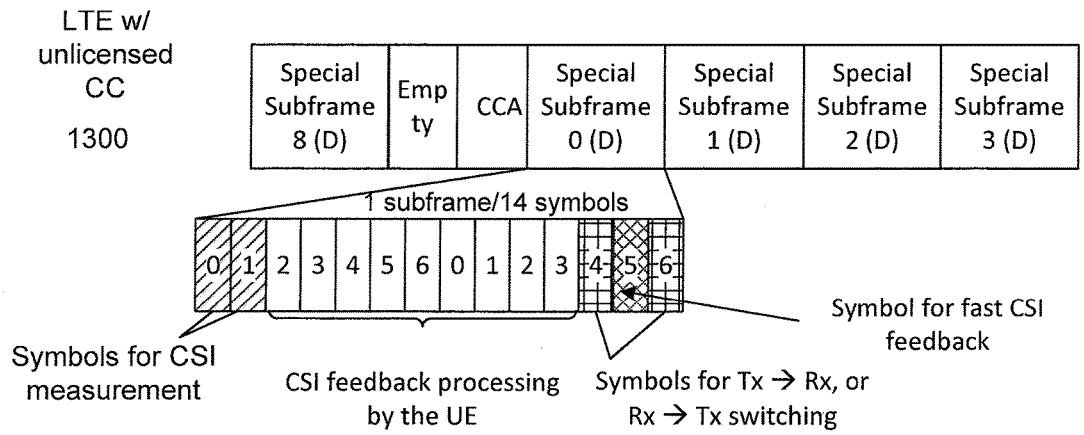
FIG. 13 illustrates a downlink transmission stream over a carrier of a shared spectrum that may include licensed and unlicensed spectrum from a base station configured according to one aspect of the present disclosure.

Alternative aspects of the present disclosure may, instead of a reduced 0.5 ms UL transmission, designate a single UL symbol for fast CSI feedback. Such aspects may configure CCs of a downlink subframe in LTE/LTE-A networks including unlicensed spectrum to have a special subframe-like structure, in which a single symbol may accommodate an uplink CSI feedback transmission. FIG. 13 illustrates a downlink transmission stream 1300 over a carrier of a shared spectrum that may include licensed and unlicensed spectrum from a base station configured according to one aspect of the present disclosure. The base station associated with downlink transmission stream 1300 transmits the reference signal for CSI measurements in symbols 0 and 1 of downlink SF0. Without any available uplink carriers, the UE providing the CSI feedback would not be able to transmit the CSI report to the base station. Accordingly, an indication from the UE is received by the base station that it will switch one of the downlink symbols, downlink symbol 5, of downlink SF0, to an uplink symbol. With the switched symbol, the UE will transmit the fast CSI report in the switched symbol 5 of downlink SF0. Symbols 4 and 6 of downlink SF0 will be used as the transmission periods for switching the frame structure from downlink, to uplink, and then back to downlink.

Figure 14:
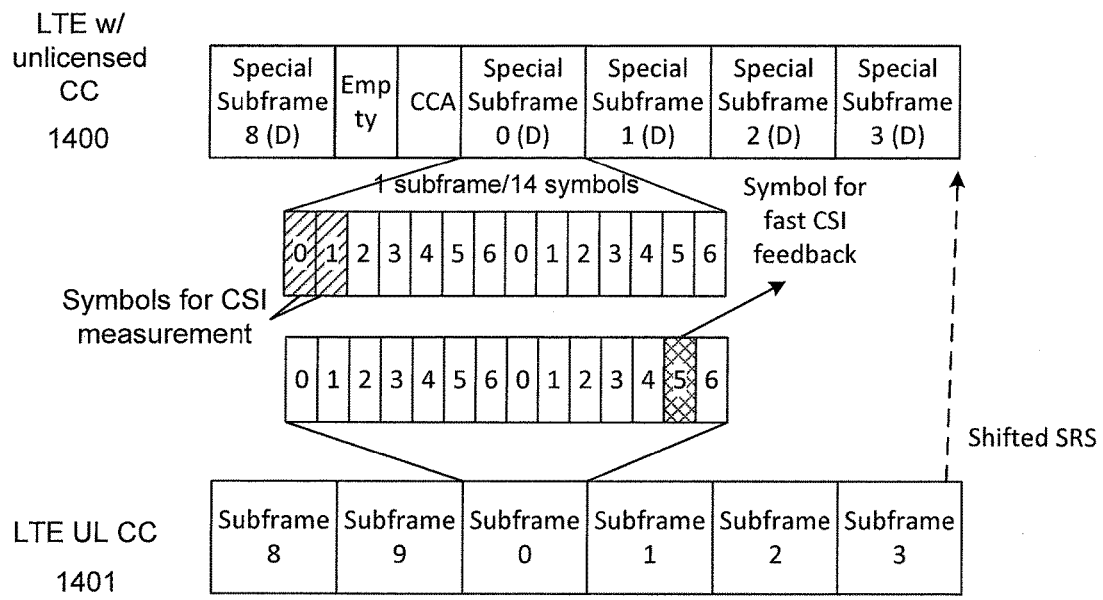
FIG. 14 illustrates a portion of a downlink transmission stream over a carrier of a shared spectrum that may include licensed and unlicensed spectrum from a base station and an associated uplink transmission stream from a UE, the base station and UE configured according to one aspect of the present disclosure.

A similar single symbol CSI feedback structure may also be configured for an LTE UL CC, when such a dedicated UL CC is available. FIG. 14 illustrates a portion of a downlink transmission stream 1400 over a carrier of a shared spectrum that may include licensed and unlicensed spectrum from a base station and an associated uplink transmission stream 1401 from a UE, the base station and UE configured according to one aspect of the present disclosure. For example, uplink symbol 5 of uplink subframe 0 may be designated as the fast CSI feedback reporting symbol. Accordingly, the UE associated with uplink transmission frame 1401 would transmit the fast CSI feedback report, based on the measurement of the reference signal transmitted by the base station in symbols 0 and 1 of downlink subframe 0, in the designated uplink symbol 5.

In LTE systems, a UE generally transmits sounding reference signals (SRS) in the last symbol, of the last uplink subframe when configured to transmit SRS. Additional aspects of the present disclosure provide for conveying CSI feedback information using the SRS transmission. For example, by using different cyclic shifts for the SRS, some CSI information may be conveyed associated with the particular shift. Thus, with reference to FIG. 14, in an alternative example, subframe 3 of uplink transmission frame 1401 may include an SRS that has been cyclically shifted in a manner to convey the CSI information. In operation, two or fewer bits of CSI information may be practically conveyed by using different cyclic shifts of SRS transmission without additional complexity. However, various additional aspects may provide more than two bits of CSI information with potential coding schemes for the different available cyclic shifts.

Similar to conveying CSI feedback information using cyclic shift of SRS transmissions, a fast CSI report may be modulated using a modulation order that is based on UE channel conditions. Such use of modulation order is also similar to piggybacking CSI reports on PUSCH transmissions, wherein the modulation order of the CQI report follows the modulation order of the PUSCH transmission.

When transmitting CSI feedback information using PUCCH, aspects of the present disclosure may provide for multiple PUCCH channels to be used depending on the payload size of CSI feedback report. The designated PUCCH channels may also be located in contiguous RBs. Thus, for fast CSI reports fewer PUCCH channels may be used, while for a full CSI report, more PUCCH channels may be supported.

Various aspects of the present disclosure may provide more flexibility in the CSI reporting opportunities through a form of dedicated signaling, such as groupcast or broadcast signaling. For example, signaling embedded into a common group control signal, such as the downlink control indicator (DCI), may be introduced in which a UE monitors one or more bits in the control signal to determine whether to report a fast CSI feedback report in a subframe or not. Such indicators may be provided from the CC over which the group control signal is transmitted or may be provided in a cross-carrier fashion for different CCs.

FIGS. 15 and 16 illustrate portions of downlink transmission streams over unlicensed and licensed frequency carriers from a base station and an associated uplink transmission stream from a UE, the base station and UE configured according to one aspect of the present disclosure.

Figure 15A:
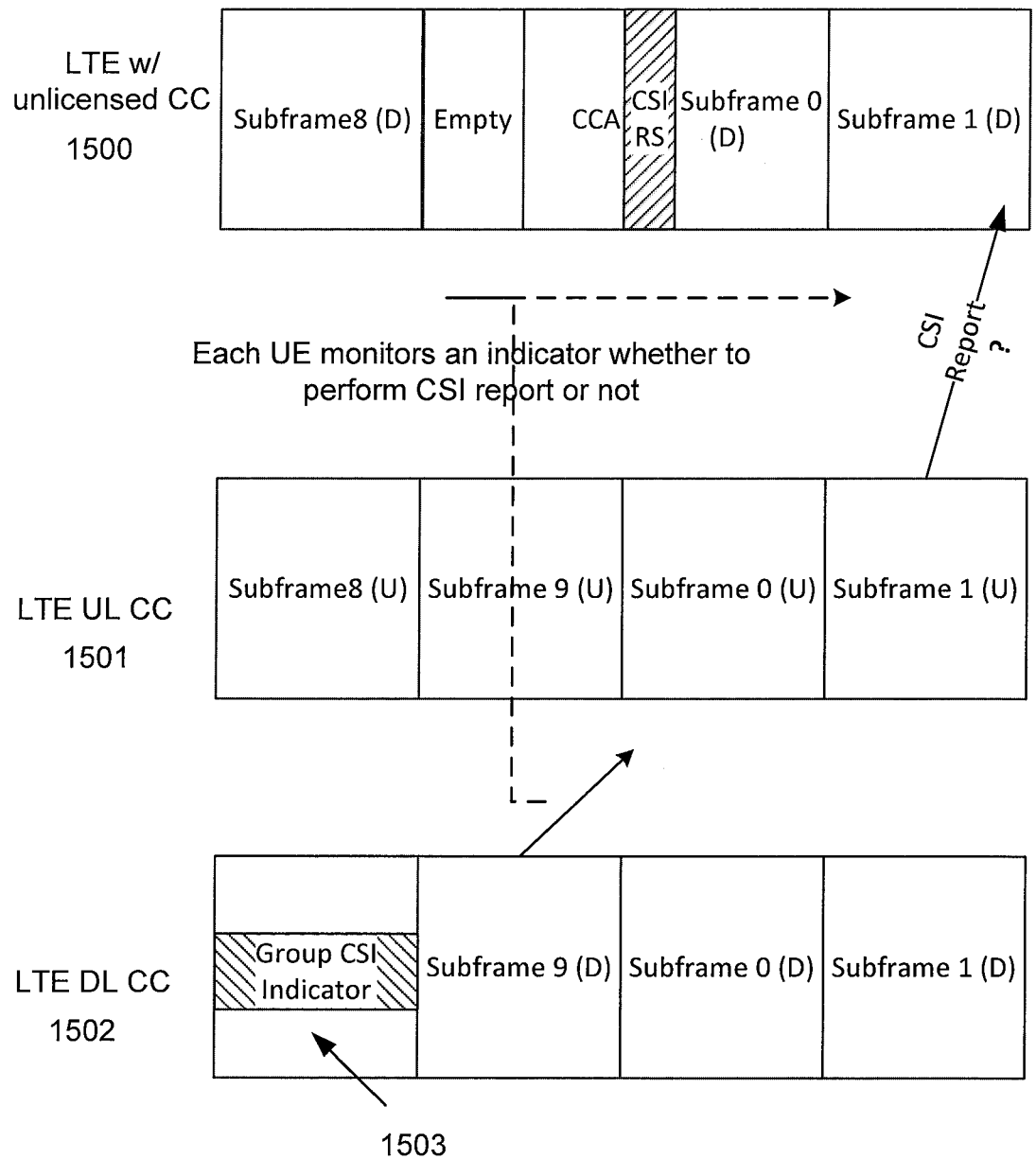
FIGS. 15A and 15B illustrate portions of downlink transmission streams over unlicensed and licensed frequency carriers from a base station and an associated uplink transmission stream from a UE, the base station and UE configured according to one aspect of the present disclosure.
Figure 15B:
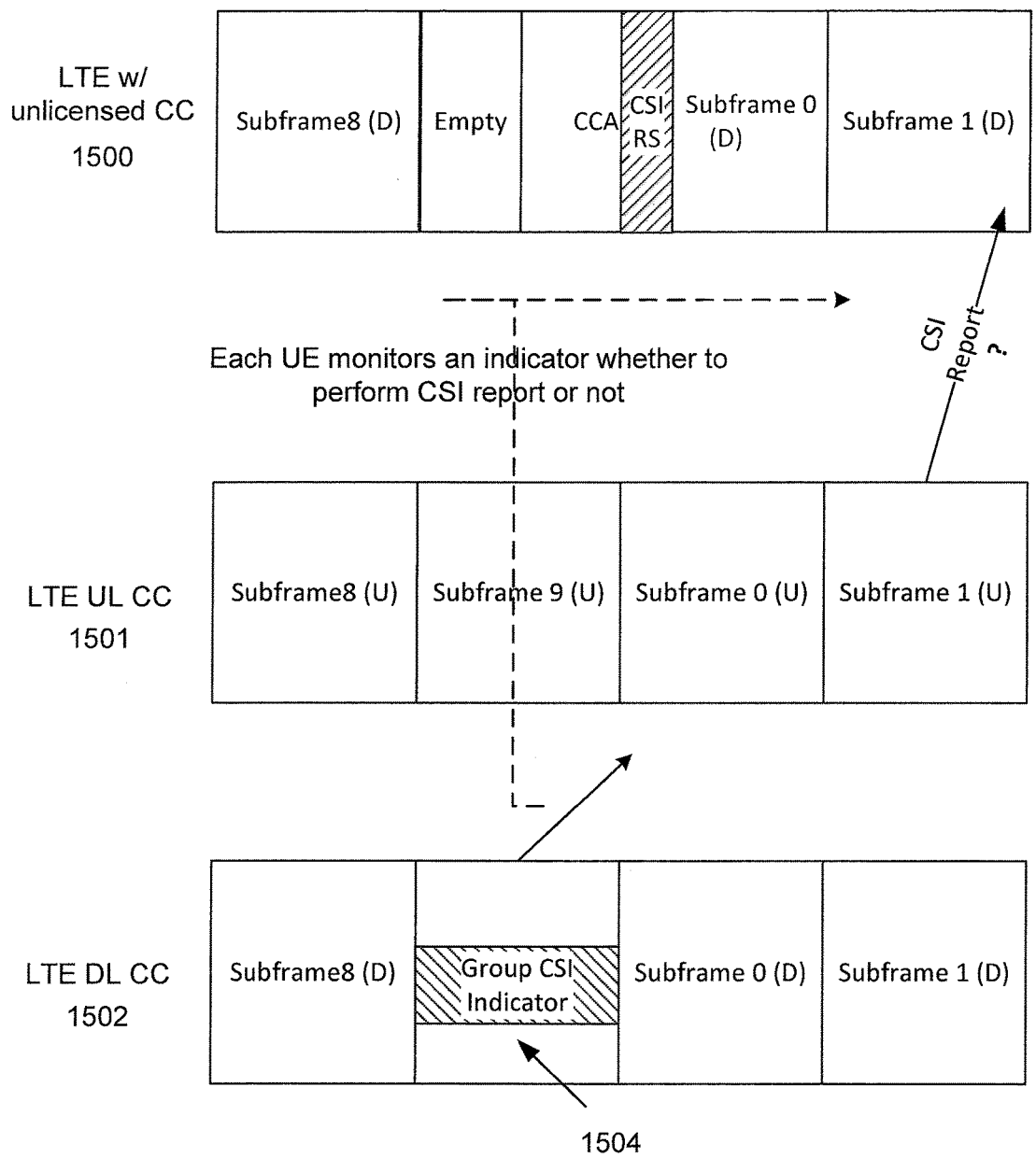

In deciding to provide a group triggering signal for fast CSI feedback reporting to a group of UEs, an eNB can make such a decision related to its own scheduling. For example, if a UE is to be scheduled due to traffic needs, various aspects of the present disclosure allow for the serving eNB to trigger the UE to send fast CSI reports. Placement of such a fast CSI report triggering signal/channel may be preferable before the subframe on which CSI measurement is performed. FIGS. 15A and 15B illustrate portions of downlink transmission streams over unlicensed 1500 and licensed 1502 frequency carriers from a base station and an associated uplink transmission stream 1501 from a UE, the base station and UE configured according to one aspect of the present disclosure. When, as illustrated in FIG. 15A, the group fast CSI indicator 1503 is placed prior to the subframe in which the CSI reference signal is transmitted, the UE associated with uplink transmission frame 1501 may skip both CSI measurement in uplink Subframe 0 and reporting in uplink Subframe 1, which may save considerable processing resources and, thus, save power. However, when, as illustrated in FIG. 15B, the group fast CSI indicator 1504 is placed in the same subframe as the CSI reference signal, the UE may still undertake CSI measurement and compute the fast CSI feedback report, but, depending on whether group fast CSI indicator 1504 indicates to disable or enable fast CSI reporting, the UE may or may not skip transmission of the report, since the decoding the CSI triggering indication may complete after the CSI measurement resource is received by the UE.

Additional aspects of the present disclosure may provide for multiple CSI triggering indication. Thus, a UE may monitor one or more CSI triggers in one channel in a subframe, where the one or more CSI triggers may correspond to different CCs and/or different subframes. Each cell may also transmit one or more CSI triggering channels, e.g., targeting different groups of UEs. These different CCs can be a set of physical CCs or a set of virtual CCs.

For the UEs triggered to report CSI, aspects of the present disclosure may provide for the same or different CSI reporting delays to be specified for different UEs. For example, staggering of the CSI reporting may be enabled, such that a first set of UEs report in a first time instance, while a second set of UEs report in a second time instance. This staggering may help to balance UL overhead. Moreover, for the UEs reporting fast CSI feedback, the PUCCH/PUSCH resource can be semi-statically or dynamically indicated. For example, in the group common DCI, there may be multiple indices for multiple UEs, and these indices can be used to derive the PUCCH/PUSCH resource.

For LTE/LTE-A networks including unlicensed spectrum, UEs preparing UL transmissions perform CCA checks for each of the UL CCs on which transmissions may occur. In various aspects of the present disclosure, when multiple UL CCs are configured for UE transmissions, CSI feedback reporting may be performed on an UL CC which provides the earliest UL reporting opportunity. This is different from LTE networks without unlicensed spectrum, where, for aperiodic CSI reporting, the UL CC that carries the A-CSI report is the UL CC corresponding to the DCI that carries the A-CSI triggering. For periodic CSI, the transmission would either be on PUCCH or on the PUSCH CC having the lowest cell index. In aspects in LTE/LTE-A networks including unlicensed spectrum, periodic CSI reporting on PUCCH or both periodic and aperiodic CSI reporting on PUSCH may be transmitted on the UL CC with CCA cleared and the lowest cell index or some other similar readily identifiable CC.

It should be noted that, for at least some PUSCH transmissions on at least one UL CC, CSI reporting for at least the corresponding DL CC and possibly for other DL CCs may be piggybacked on the PUSCH transmission, even without A-CSI triggering or outside periodic CSI transmission instances. For example, CSI reporting may be piggybacked onto PUSCH transmissions in the first UL subframe of a frame. Such an aspect may include constraints on the piggybacked transmission, such as when the TBS/MCS of a PUSCH is large.

LTE/LTE-A networks including unlicensed spectrum may be implemented using different types of deployments: supplemental downlink (SDL), carrier aggregation (CA), and standalone (SA) deployments. In SDL deployments, the unlicensed spectrum may be used as additional downlink carriers along with typical LTE licensed spectrum carriers. CA deployments provide CCs in unlicensed spectrum in a CA configuration with CCs in licensed spectrum, while SA deployments provide LTE/LTE-A communications solely over unlicensed spectrum. Support or enablement of fast CSI feedback of some of the features discussed earlier may depend on the particular deployment of LTE/LTE-A including unlicensed spectrum (e.g., SDL, CA, SA).

For example, when a UE is configured with a LTE licensed spectrum CC as the primary CC, because of the guaranteed UL transmissions, some flexible CSI reporting mechanisms may be disabled or not supported (e.g., CSI reporting for a DL CC can be done on a UL CC which provides the earliest UL reporting opportunity). Fast feedback may then be supported for SDL and CA deployments of LTE/LTE-A including unlicensed spectrum, but may not be supported for SA, because there would generally be no UL subframe for fast CSI feedback.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIGS. 6 and 7 may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
    detecting, by a user equipment (UE), a reference signal from a serving base station over a carrier of shared spectrum;
    measuring, by the UE, the reference signal;
    generating, by the UE, a fast channel station information (CSI) feedback report based on the measured reference signal, wherein the generating the fast CSI feedback report includes one or more of:
        reducing a bitwidth of a standard CSI feedback report for the fast CSI feedback report;
        selecting a subset of CSI reporting types from a plurality of available CSI reporting types for including in the fast CSI feedback report;
        selecting a subset of CSI processes from a plurality of available CSI processes for including in the fast CSI feedback report;
        reducing CSI measurement processing of the reference signal measuring for the fast CSI feedback report; and
        reducing a transmission duration of CSI reporting for the fast CSI feedback report; and
    transmitting, by the UE, the fast CSI feedback report to the serving base station.

2. The method of claim 1, wherein the detecting includes:
    detecting the reference signal in a first subframe of a transmission frame of the serving base station.

3. The method of claim 1, wherein the reference signal includes a channel usage beacon signal (CUBS) from the serving base station.

4. The method of claim 1, further including:
generating a non-fast CSI feedback report based, at least in part, on the reference signal; and
transmitting the non-fast CSI feedback report at a later interval from the fast CSI feedback report.

5. The method of claim 4, wherein the non-fast CSI feedback report includes one of:
a standard CSI feedback report; or
a refined CSI feedback report, wherein the refined CSI feedback report is based on one of: additional channel information or interference information.

6. The method of claim 1, wherein the fast CSI feedback report is transmitted in an uplink subframe following a downlink subframe from which the reference signal is detected.

7. The method of claim 1, further including:
receiving a fast CSI reporting indicator from the serving base station, wherein the fast CSI reporting indicator indicates to the UE whether to enable or disable fast CSI reporting.

8. The method of claim 7, wherein, in response to receiving the fast CSI reporting indicator indicating to disable fast CSI reporting, the UE disables each one or more of the measuring, the generating, and the transmitting occurring after the fast CSI reporting indicator is received.

9. The method of claim 1, wherein the transmitting the fast CSI feedback report includes:
determining, by the UE, an earliest available uplink carrier of a plurality of uplink carriers; and
transmitting the fast CSI feedback report on the determined earliest available uplink carrier.

10. The method of claim 1, wherein the shared spectrum is at least one of an unlicensed spectrum or a spectrum allowing sharing among a plurality of operators.

11. An apparatus for wireless communication, comprising:
means for detecting, by a user equipment (UE), a reference signal from a serving base station over a carrier of shared spectrum;
means for measuring, by the UE, the reference signal;
means for generating, by the UE, a fast channel station information (CSI) feedback report based on the measured reference signal, wherein the means for generating the fast CSI feedback report includes one or more of:
means for reducing a bitwidth of a standard CSI feedback report for the fast CSI feedback report;
means for selecting a subset of CSI reporting types from a plurality of available CSI reporting types for including in the fast CSI feedback report;
means for selecting a subset of CSI processes from a plurality of available CSI processes for including in the fast CSI feedback report;
means for reducing CSI measurement processing of the reference signal measuring for the fast CSI feedback report; and
means for reducing a transmission duration of CSI reporting for the fast CSI feedback report; and
means for transmitting, by the UE, the fast CSI feedback report to the serving base station.

12. The apparatus of claim 11, wherein the means for detecting includes:
means for detecting the reference signal in a first subframe of a transmission frame of the serving base station.

13. The apparatus of claim 11, further including:
means for generating a non-fast CSI feedback report based, at least in part, on the reference signal; and
means for transmitting the non-fast CSI feedback report at a later interval from the fast CSI feedback report.

14. The apparatus of claim 13, wherein the non-fast CSI feedback report includes one of:
a standard CSI feedback report; or
a refined CSI feedback report, wherein the refined CSI feedback report is based on one of: additional channel information or interference information.

15. The apparatus of claim 11, wherein the fast CSI feedback report is transmitted in an uplink subframe following a downlink subframe from which the reference signal is detected.

16. The apparatus of claim 11, wherein the means for transmitting the fast CSI feedback report includes:
means for determining, by the UE, an earliest available uplink carrier of a plurality of uplink carriers; and
means for transmitting the fast CSI feedback report on the determined earliest available uplink carrier.

17. The apparatus of claim 11, wherein the shared spectrum is at least one of an unlicensed spectrum or a spectrum allowing sharing among a plurality of operators.

18. A non-transitory computer-readable medium having program code recorded thereon, the program code including:
program code for causing a computer to detect, by a user equipment (UE), a reference signal from a serving base station over a carrier of a shared spectrum;
program code for causing the computer to measure, by the UE, the reference signal;
program code for causing the computer to generate, by the UE, a fast channel station information (CSI) feedback report based on the measured reference signal, wherein the program code for causing the computer to generate the fast CSI feedback report includes one or more of:
program code for causing the computer to reduce a bitwidth of a standard CSI feedback report for the fast CSI feedback report;
program code for causing the computer to select a subset of CSI reporting types from a plurality of available CSI reporting types for including in the fast CSI feedback report;
program code for causing the computer to select a subset of CSI processes from a plurality of available CSI processes for including in the fast CSI feedback report;
program code for causing the computer to reduce CSI measurement processing of the reference signal measuring for the fast CSI feedback report; and
program code for causing the computer to reduce a transmission duration of CSI reporting for the fast CSI feedback report; and
program code for causing the computer to transmit, by the UE, the fast CSI feedback report to the serving base station.

19. The non-transitory computer-readable medium of claim 18, wherein the program code for causing the computer to detect includes:
program code for causing the computer to detect the reference signal in a first subframe of a transmission frame of the serving base station.

20. The non-transitory computer-readable medium of claim 18, wherein the fast CSI feedback report is transmitted in an uplink subframe following a downlink subframe from which the reference signal is detected.

21. The non-transitory computer-readable medium of claim 18, wherein the shared spectrum is at least one of an unlicensed spectrum or a spectrum allowing sharing among a plurality of operators.

22. An apparatus configured for wireless communication, the apparatus comprising:
   at least one processor; and
   a memory coupled to the at least one processor,
   wherein the at least one processor is configured:
      to detect, by a user equipment (UE), a reference signal from a serving base station over a carrier of a shared spectrum;
      to measure, by the UE, the reference signal;
      to generate, by the UE, a fast channel station information (CSI) feedback report based on the measured reference signal, wherein the configuration of the at least one processor to generate the fast CSI feedback report includes configuration of the at least one processor to one or more of:
         reduce a bitwidth of a standard CSI feedback report for the fast CSI feedback report;
         select a subset of CSI reporting types from a plurality of available CSI reporting types for including in the fast CSI feedback report;
         select a subset of CSI processes from a plurality of available CSI processes for including in the fast CSI feedback report;
         reduce CSI measurement processing of the reference signal measuring for the fast CSI feedback report; and
         reduce a transmission duration of CSI reporting for the fast CSI feedback report; and
      to transmit, by the UE, the fast CSI feedback report to the serving base station.

23. The apparatus of claim 22, wherein the configuration of the at least one processor to detect includes configuration to detect the reference signal in a first subframe of a transmission frame of the serving base station.

24. The apparatus of claim 22, wherein the fast CSI feedback report is transmitted in an uplink subframe following a downlink subframe from which the reference signal is detected.

25. The apparatus of claim 24, wherein, in response to receiving the fast CSI reporting indicator indicating to disable fast CSI reporting, the UE disables each one or more of the configuration of the at least one processor to measure, to generate, and to transmit occurring after the fast CSI reporting indicator is received.

26. The apparatus of claim 22, wherein the shared spectrum is at least one of an unlicensed spectrum or a spectrum allowing sharing among a plurality of operators.

* * * * *